US010200960B2

United States Patent
Harel

(10) Patent No.: US 10,200,960 B2
(45) Date of Patent: Feb. 5, 2019

(54) REMOTE ANTENNA UNIT (RAU) WITH MULTIPLE ANTENNA ASSEMBLY IN A DISTRIBUTED ANTENNA SYSTEM (DAS)

(71) Applicant: Corning Optical Communications Wireless Ltd, Airport City (IL)

(72) Inventor: Dror Harel, Hod Hasharon (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 15/920,789

(22) Filed: Mar. 14, 2018

(65) Prior Publication Data
US 2018/0206199 A1  Jul. 19, 2018

Related U.S. Application Data

(63) Continuation of application No. PCT/IB2016/055671, filed on Sep. 22, 2016.
(Continued)

(51) Int. Cl.
*H04W 52/42* (2009.01)
*H01P 5/12* (2006.01)
(Continued)

(52) U.S. Cl.
CPC .............. *H04W 52/42* (2013.01); *H01P 5/12* (2013.01); *H04B 7/0408* (2013.01);
(Continued)

(58) Field of Classification Search
CPC .............................. H04W 52/42; H04W 16/28
See application file for complete search history.

(56) References Cited

U.S. PATENT DOCUMENTS 5,564,121 A    10/1996  Chow et al.
6,405,018 B1    6/2002  Reudink et al.
(Continued)

FOREIGN PATENT DOCUMENTS

CN      102664669 A       9/2012
EP      2 375 499 B1 *   3/2011    ............. H01Q 23/00
(Continued)

OTHER PUBLICATIONS

International Search Report and Written Opinion PCT/IB2016/055671 dated Dec. 23, 2016.

*Primary Examiner* — Tuan H Nguyen
(74) *Attorney, Agent, or Firm* — C. Keith Montgomery

(57) ABSTRACT

Embodiments of the disclosure relate to a remote antenna unit (RAU) with multiple antenna assembly in a distributed antenna system (DAS). In this regard, an RAU(s) in a DAS includes a plurality of directional antennas, a power generation circuit, and a controller. The power generation circuit is configured to generate a power output having an aggregated power. The controller is configured to allocate the aggregated power to the directional antennas based on a power allocation scheme. By allocating the aggregated power between the directional antennas based on the power allocation scheme, it is possible to programmably control radiation patterns and transmission powers of the directional antennas in the RAU(s). As a result, it is possible to provide optimized radio frequency (RF) coverage throughout a coverage area(s) of the RAU(s) without preconfiguring the radiation patterns and transmission powers of the directional antennas.

19 Claims, 12 Drawing Sheets

Related U.S. Application Data

(60) Provisional application No. 62/221,770, filed on Sep. 22, 2015.

(51) Int. Cl.
| | | |
|---|---|---|
| *H04B 7/0408* | (2017.01) |
| *H04B 7/06* | (2006.01) |
| *H04B 10/2575* | (2013.01) |
| *H04W 16/28* | (2009.01) |
| *H04W 52/34* | (2009.01) |
| *H04W 88/08* | (2009.01) |
| *H04Q 11/00* | (2006.01) |
| *H04W 52/14* | (2009.01) |
| *H04W 52/52* | (2009.01) |
| *H04W 72/04* | (2009.01) |

(52) U.S. Cl.
CPC ..... *H04B 7/0695* (2013.01); *H04B 10/25754* (2013.01); *H04Q 11/0005* (2013.01); *H04W 16/28* (2013.01); *H04W 52/143* (2013.01); *H04W 52/346* (2013.01); *H04W 52/52* (2013.01); *H04W 72/046* (2013.01); *H04W 88/085* (2013.01); *H04Q 2011/0015* (2013.01); *H04W 72/0473* (2013.01)

(56) References Cited

U.S. PATENT DOCUMENTS

| | | | |
|---|---|---|---|
| 7,623,868 | B2 | 11/2009 | Judd et al. |
| 8,493,278 | B2 | 7/2013 | Lopez |
| 8,565,193 | B2 * | 10/2013 | Ylitalo .................. H01Q 1/246 |
| | | | 370/252 |
| 2011/0255434 | A1 | 10/2011 | Ylitalo |

FOREIGN PATENT DOCUMENTS

| | | |
|---|---|---|
| JP | 6333002 | 11/1991 |
| WO | 2007057517 A1 | 5/2007 |

\* cited by examiner

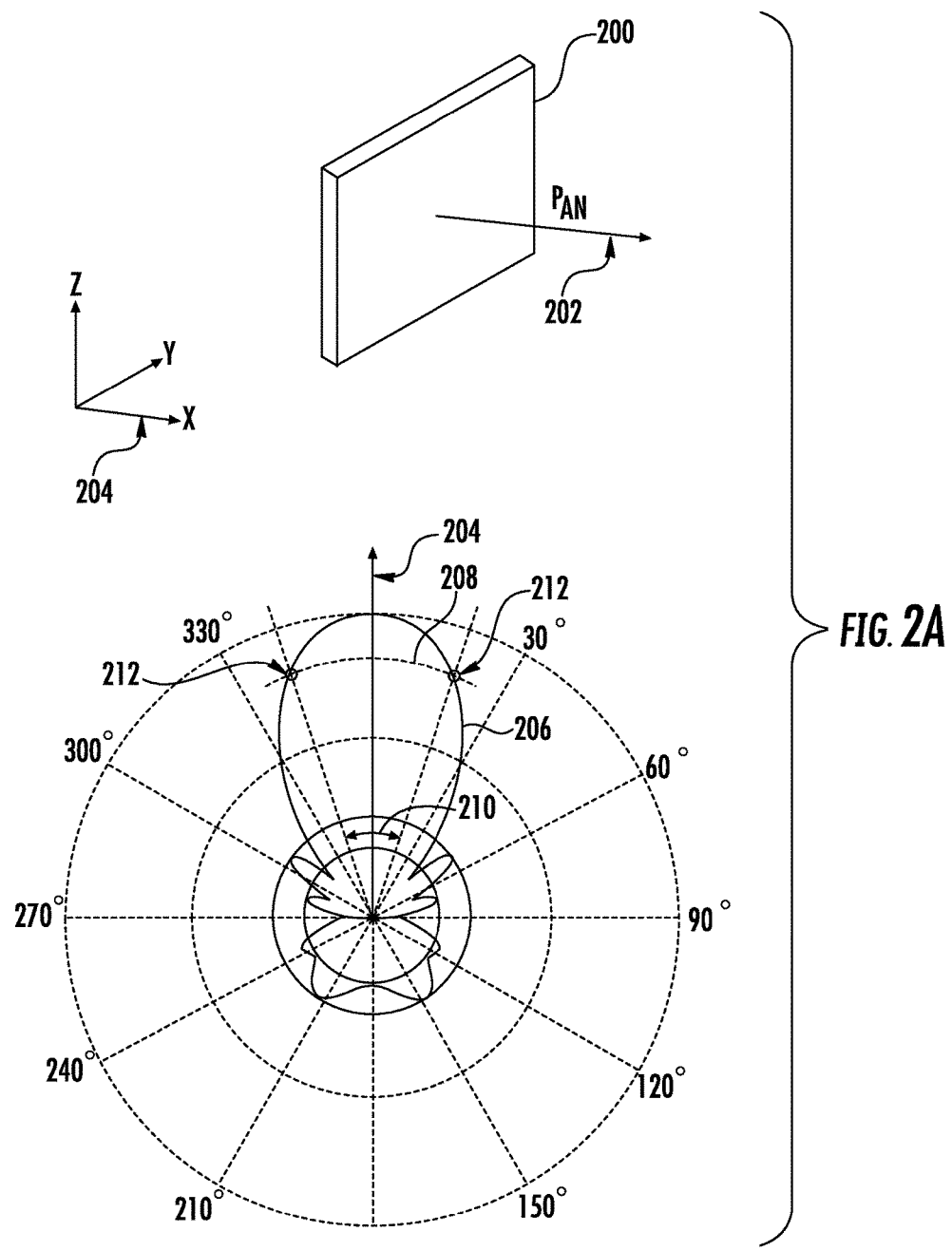

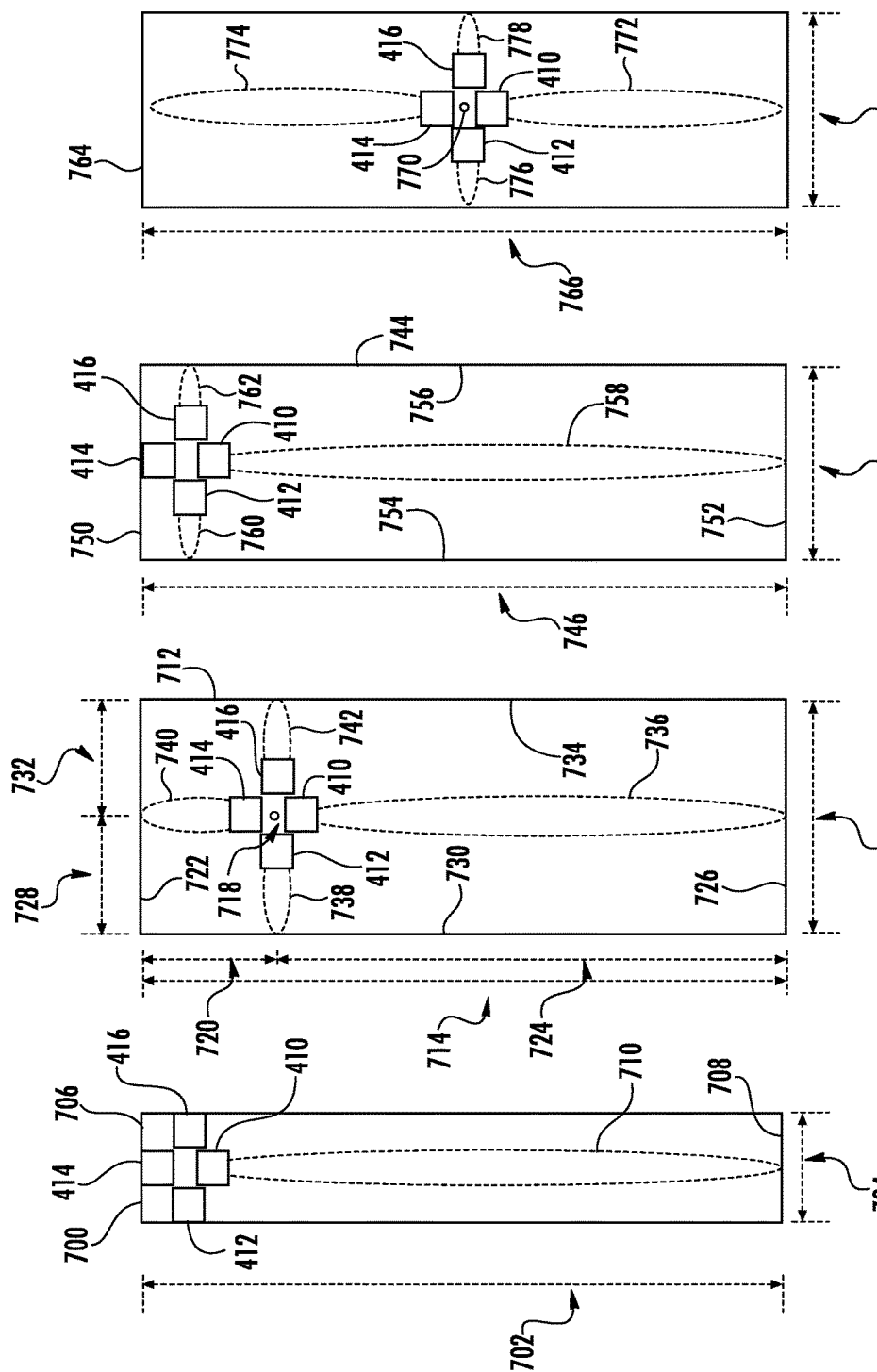

REMOTE ANTENNA UNIT (RAU) WITH MULTIPLE ANTENNA ASSEMBLY IN A DISTRIBUTED ANTENNA SYSTEM (DAS)

CROSS-REFERENCE TO RELATED APPLICATIONS

This is a continuation of International Application No. PCT/IB2016/055671, filed Sep. 22, 2016, which claims the benefit of priority under 35 U.S.C. § 119 of U.S. Provisional Application Ser. No. 62/221,770, filed on Sep. 22, 2015, the contents of which are relied upon and incorporated herein by reference in their entireties.

BACKGROUND

The disclosure relates generally to wireless distribution system (WDS) and more particularly to techniques for distribution of power to antennas within a distributed antenna system (DAS).

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within the antenna range of the remote units. DASs can be particularly useful when deployed inside buildings or other indoor environments where the wireless communications devices may not otherwise be able to effectively receive RF signals from a signal source.

In this regard, FIG. 1 illustrates distribution of communication services to remote coverage areas 100(1)-100(N) of a WDS 102 provided in the form of a DAS, wherein 'N' is the number of remote coverage areas. These communication services can include cellular services, wireless services, such as radio frequency identification (RFID) tracking, Wireless Fidelity (Wi-Fi), local area network (LAN), wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote antenna units (RAUs) 104(1)-104(N) connected to a head-end equipment (HEE) 106 (e.g., a head-end controller, a head-end unit (HEU), or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the RAUs 104(1)-104(N). The RAUs 104(1)-104(N) are configured to receive the downlink communications signals 110D from the HEE 106 over a communications medium 112 to be distributed to the respective remote coverage areas 100(1)-100(N) of the RAUs 104(1)-104(N). In a non-limiting example, the communications medium 112 may be a wired communications medium, a wireless communications medium, or an optical fiber-based communications medium. Each of the RAUs 104(1)-104(N) may include an RF transmitter/receiver and a respective antenna 114(1)-114(N) operably connected to the RF transmitter/receiver to wirelessly distribute the communication services to client devices 116 within the respective remote coverage areas 100(1)-100(N). The RAUs 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective RAUs 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the RAUs 104(1)-104(N) mainly determine the size of the respective remote coverage areas 100(1)-100(N).

Each of the antennas 114(1)-114(N) may be provided as an omnidirectional antenna, which provides equal radiation to 360° around the antenna in the horizontal plan, or as a directional antenna that has radiation energies focused to a certain direction(s). It is also possible to configure each of the antennas 114(1)-114(N) as an antenna array of multiple directional antennas. In this regard, the multiple directional antennas in the antenna array can be arranged to transmit the downlink communications signals 110D in different directions to provide improved RF coverage in the respective remote coverage areas 100(1)-100(N). In this regard, it may be desirable to effectively control directional radiation patterns of the multiple directional antennas to meet specific coverage requirements of the client devices 116 located at certain endpoints in the respective remote coverage areas 100(1)-100(N).

No admission is made that any reference cited herein constitutes prior art. Applicant expressly reserves the right to challenge the accuracy and pertinency of any cited documents.

SUMMARY

Embodiments of the disclosure relate to a remote antenna unit (RAU) with multiple antenna assembly in a distributed antenna system (DAS). In this regard, an RAU(s) in a DAS includes a plurality of directional antennas, a power generation circuit, and a controller. The power generation circuit is configured to generate a power output having an aggregated power. The controller is configured to allocate the aggregated power to the directional antennas based on a power allocation scheme. By allocating the aggregated power between the directional antennas based on the power allocation scheme, it is possible to programmably control radiation patterns and transmission powers of the directional antennas in the RAU(s). As a result, it is possible to provide optimized radio frequency (RF) coverage throughout a coverage area(s) of the RAU(s) without preconfiguring the radiation patterns and transmission powers of the directional antennas.

In one embodiment, an RAU in a DAS is provided. The RAU comprises a plurality of directional antennas. The RAU also comprises a power generation circuit configured to generate a power output having an aggregated power. The RAU also comprises a controller configured to instruct the power generation circuit to allocate the aggregated power to the plurality of directional antennas based on a power allocation scheme.

In another embodiment, a method for allocating power between a plurality of directional antennas in an RAU in a DAS is provided. The method comprises generating a power output having an aggregated power. The method also comprises allocating the aggregated power to the plurality of directional antennas based on a power allocation scheme.

In another embodiment, a DAS is provided. The DAS comprises a head-end unit (HEU). The DAS also comprises a plurality of RAUs. The plurality of RAUs is configured to receive a plurality of downlink electrical communications signals from the HEU. The plurality of RAUs is also configured to provide a plurality of uplink electrical communications signals to the HEU. At least one RAU among the plurality of RAUs comprises a plurality of directional antennas. The at least one RAU also comprises a power generation circuit configured to generate a power output having an aggregated power. The at least one RAU also comprises a controller configured to instruct the power generation circuit to allocate the aggregated power to the plurality of directional antennas based on a power allocation scheme.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 2A is a schematic diagram of an exemplary directional antenna configured to transmit an electromagnetic signal in an X direction;

FIGS. 7A-7D are schematic diagrams providing exemplary illustrations of determining the power allocation scheme for the RAU of FIG. 4 based on intended coverage areas of the RAU;

DETAILED DESCRIPTION

Embodiments of the disclosure relate to a remote antenna unit (RAU) with multiple antenna assembly in a distributed antenna system (DAS). In this regard, an RAU(s) in a DAS includes a plurality of directional antennas, a power generation circuit, and a controller. The power generation circuit is configured to generate a power output having an aggregated power. The controller is configured to allocate the aggregated power to the directional antennas based on a power allocation scheme. By allocating the aggregated power between the directional antennas based on the power allocation scheme, it is possible to programmably control radiation patterns and transmission powers of the directional antennas in the RAU(s). As a result, it is possible to provide optimized radio frequency (RF) coverage throughout a coverage area(s) of the RAU(s) without preconfiguring the radiation patterns and transmission powers of the directional antennas.

Figure 2B:
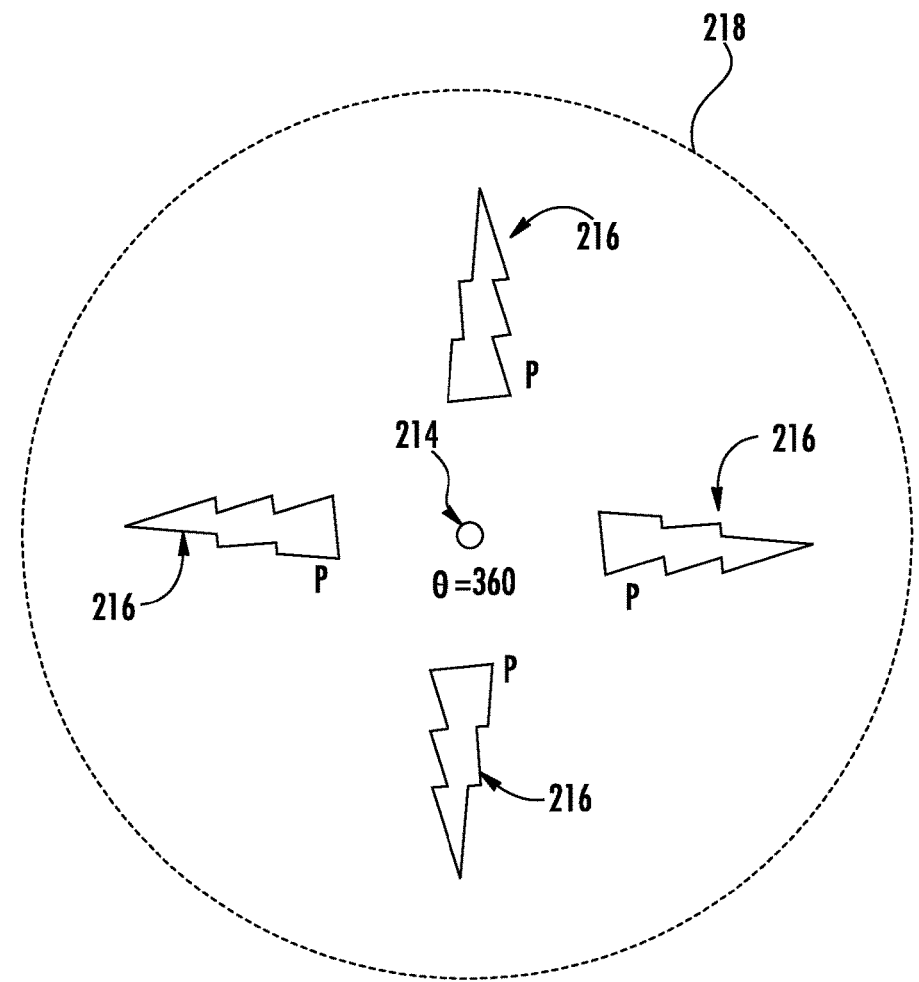
FIG. 2B is a schematic diagram of an exemplary omni-directional antenna configured to radiate an electromagnetic signal around the omnidirectional antenna.

Before discussing exemplary aspects of an RAU with multiple antenna assembly that includes specific aspects of the present disclosure, a brief overview of radiation patterns of directional and omnidirectional antennas are first provided in FIGS. 2A and 2B, respectively. A brief discussion of a multiple antenna assembly including multiple directional antennas is then provided in FIGS. 3A and 3B. The discussion of exemplary aspects of RAU with multiple antenna assembly starts with reference to FIG. 4.

In this regard, FIG. 2A is a schematic diagram of an exemplary directional antenna 200 configured to transmit an electromagnetic signal 202 in an X direction 204. The directional antenna 200 has a main lobe 206 that contains a maximum radiated power $P_{AN}$. As such, by being configured to generate the main lobe 206 in the X direction 204, the directional antenna 200 is able to transmit the electromagnetic signal 202 with the maximum radiated power $P_{AN}$ in the X direction 204. A directionality of the directional antenna 200 may be determined based on a beamwidth 208 of the main lobe 206. The beamwidth 208 corresponds to an angle 210 defined by a pair of half-power points 212 of the main lobe 206, in relation to the maximum radiated power $P_{AN}$. Specifically, the pair of half-power points 212 represents negative three decibels (−3 dB) radiate power of the main lobe 206. In this regard, the smaller the beamwidth 208, the higher the directionality of the directional antenna 200.

In contrast to the directional antenna 200, FIG. 2B is a schematic diagram of an exemplary omnidirectional antenna 214 configured to radiate an electromagnetic signal 216 omnidirectionally around the omnidirectional antenna 214. As shown in FIG. 2B, the omnidirectional antenna 214 transmits the electromagnetic signal 216 within a 360° radius 218 around the omnidirectional antenna 214. In this regard, the omnidirectional antenna 214 transmits the electromagnetic signal 216 with equal radiated power P in all directions. As such, the omnidirectional antenna 214 does not generate a main lobe, like the main lobe 206 generated by the directional antenna 200 in FIG. 2A.

Figure 1:
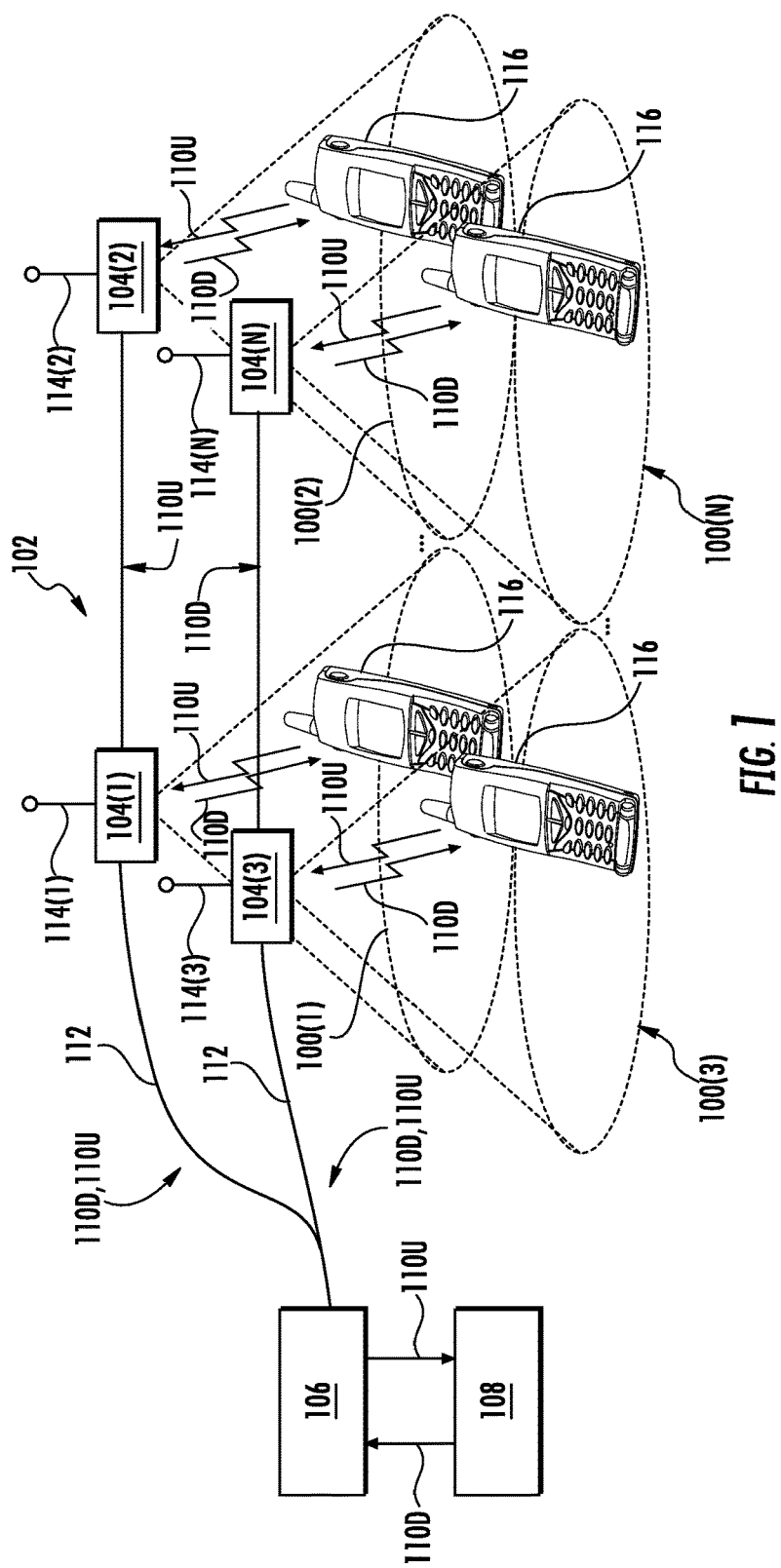
FIG. 1 is a schematic diagram of an exemplary wireless distribution system (WDS)

The omnidirectional antenna 214 may be provided in the respective RAUs 104(1)-104(N) of FIG. 1 to serve the respective remote coverage areas 100(1)-100(N) in the WDS 102. Since the omnidirectional antenna 214 transmits the electromagnetic signal 216 with equal radiated power P in all directions, the respective remote coverage areas 100(1)-100(N) served by the omnidirectional antenna 214 is confined to the 360° radius 218.

In some cases, the respective remote coverage areas 100(1)-100(N) in which the WDS 102 is installed may be irregularly shaped due to environmental restrictions, especially when the WDS 102 is installed indoors. For example, the respective remote coverage areas 100(1)-100(N) can be a narrow rectangular room in a building, as opposed to a circular-shaped open space in a building. In this regard, providing the omnidirectional antenna 214 in the respective remote coverage areas 100(1)-100(N) may result in inadequate RF coverage in some parts of the respective remote coverage areas 100(1)-100(N), and excessive RF radiation outside the respective remote coverage areas 100(1)-100(N).

In contrast, the directional antenna 200 in FIG. 2A may be a better alternative to the omnidirectional antenna 214 in FIG. 2B in the respective remote coverage areas 100(1)-100(N) of a narrow rectangular room. For example, the beamwidth 208 of the directional antenna 200 can be reduced to provide a narrow directional radiation footprint for the narrow rectangular room. Similarly, the beamwidth 208 of the directional antenna 200 can be increased to provide a wider directional radiation footprint for a wide rectangular room. As discussed above in FIG. 2A, the directional antenna 200 generates the main lobe 206 that contains the maximum radiated power $P_{AN}$ in the X direction 204. As such, it may require multiples of the directional antenna 200 in FIG. 2A to provide adequate RF coverage in all dimensions of the respective remote coverage areas 100(1)-100(N).

Figure 3A:
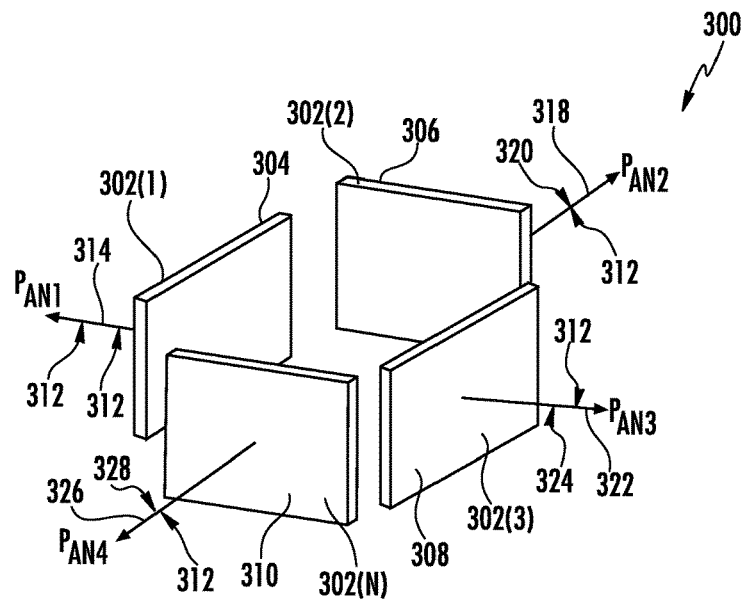
FIG. 3A is a schematic diagram of an exemplary multiple antenna assembly that includes a plurality of directional antennas.

In this regard, FIG. 3A is a schematic diagram of an exemplary multiple antenna assembly 300 that includes a plurality of directional antennas 302(1)-302(N). The directional antennas 302(1)-302(N) may have identical beamwidths or different beamwidths. For the convenience of illustration and description, the multiple antenna assembly 300 in FIG. 3A is shown to include a first directional antenna 304, a second directional antenna 306, a third directional antenna 308, and a fourth directional antenna 310. The first directional antenna 304, the second directional antenna 306, the third directional antenna 308, and the fourth directional antenna 310 are disposed according to a rectangular-shaped arrangement. It shall be appreciated that the multiple antenna assembly 300 may include more or less than the four (4) directional antennas 302(1)-302(4) illustrated in FIG. 3A. For example, the multiple antenna assembly 300 can be configured to include three (3) directional antennas disposed according to a triangular-shaped arrangement, or five (5) directional antennas disposed according to a pentagonal-shaped arrangement.

Each of the first directional antenna 304, the second directional antenna 306, the third directional antenna 308, and the fourth directional antenna 310 in the multiple antenna assembly 300 is functionally equivalent to the directional antenna 200 of FIG. 2A. In this regard, the first directional antenna 304 can be configured to transmit an RF signal 312 in a first radiation direction 314 with a first main lobe 316. The second directional antenna 306 can be configured to transmit the RF signal 312 in a second radiation direction 318 with a second main lobe 320. The third directional antenna 308 can be configured to transmit the RF signal 312 in a third radiation direction 322 with a third main lobe 324. The fourth directional antenna 310 can be configured to transmit the RF signal 312 in a fourth radiation direction 326 with a fourth main lobe 328. The first main lobe 316, the second main lobe 320, the third main lobe 324, and the fourth main lobe 328 have a respective first radiated power $PA_{AN1}$, a second radiated power $P_{AN2}$, a third radiated power $P_{AN3}$, and a fourth radiated power $P_{AN4}$. In a non-limiting example, the first main lobe 316, the second main lobe 320, the third main lobe 324, and the fourth main lobe 328 are substantially similar. The first radiated power $P_{AN1}$, the second radiated power $P_{AN2}$, the third radiated power $P_{AN3}$, and the fourth radiated power $P_{AN4}$ are substantially equal in this example. In another example, the first main lobe 316, the second main lobe 320, the third main lobe 324, and the fourth main lobe 328 are substantially different. Accordingly, the first radiated power $P_{AN1}$, the second radiated power $P_{AN2}$, the third radiated power $P_{AN3}$, and the fourth radiated power $P_{AN4}$ are also substantially different.

Figure 3B:
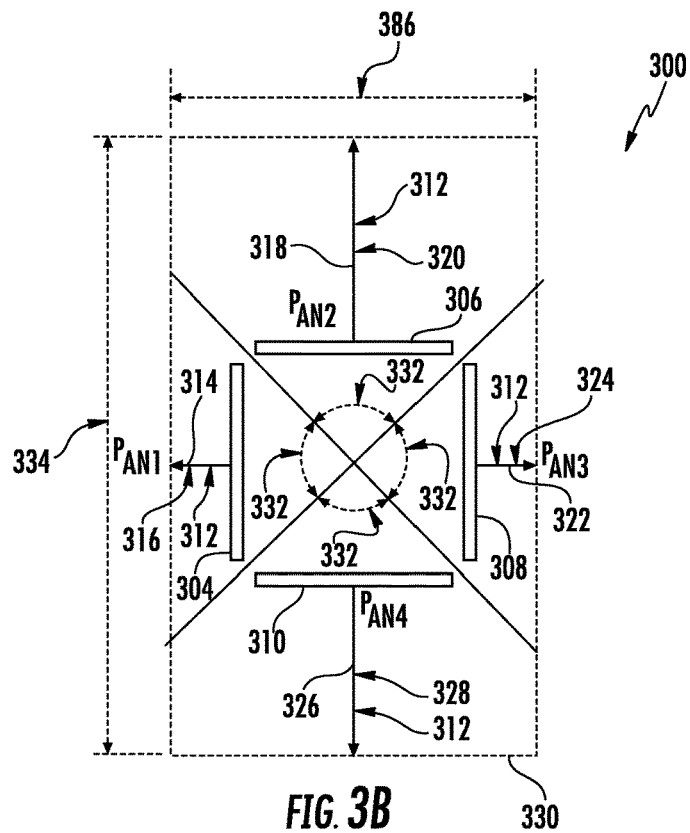
FIG. 3B is a schematic diagram providing an exemplary top view of the multiple antenna assembly of FIG. 3A configured to provide radio frequency (RF) coverage in a non-circular-shaped coverage area.

The multiple antenna assembly 300 in FIG. 3A may be configured to provide RF coverage in a non-circular-shaped coverage area. In this regard, FIG. 3B is a schematic diagram providing an exemplary top view of the multiple antenna assembly 300 of FIG. 3A configured to provide RF coverage in a non-circular-shaped coverage area 330. Common elements between FIGS. 3A and 3B are shown therein with common element numbers and will not be re-described herein.

With reference to FIG. 3B, each of the first directional antenna 304, the second directional antenna 306, the third directional antenna 308, and the fourth directional antenna 310 is a ninety-degree (90°) directional antenna. Accordingly, each of the first directional antenna 304, the second directional antenna 306, the third directional antenna 308, and the fourth directional antenna 310 is configured to transmit the RF signal 312 over an angle 332 of about 90°. As such, the multiple antenna assembly 300 may be able to provide 360° of coverage in the non-circular-shaped coverage area 330.

In this example, the non-circular-shaped coverage area 330 is a rectangular-shaped coverage area (e.g., a conference room, a building hallway, etc.) having a length 334 longer than a width 336. In this regard, if the first radiated power $P_{AN1}$, the second radiated power PAM, the third radiated power $P_{AN3}$, and the fourth radiated power $P_{AN4}$ are substantially equal, the multiple antenna assembly 300 may not be able to provide adequate RF coverage throughout the non-circular-shaped coverage area 330. For example, if the first radiated power $P_{AN1}$ in the first main lobe 316 and the third radiated power $P_{AN3}$ in the third main lobe 324 are configured to provide RF coverage up to the width 336, then the second radiated power $P_{AN2}$ in the second main lobe 320 and the fourth radiated power $P_{AN4}$ in the fourth main lobe 328 will not be sufficient to provide RF coverage up to the length 334. In contrast, if the second radiated power $P_{AN2}$ in the second main lobe 320 and the fourth radiated power $P_{AN4}$ in the fourth main lobe 328 are configured to provide RF coverage up to the length 334, then the first radiated power $P_{AN1}$ in the first main lobe 316 and the third radiated power $P_{AN3}$ in the third main lobe 324 may cause RF interference outside of the non-circular-shaped coverage area 330. As such, it may be desirable to configure the first directional antenna 304, the second directional antenna 306, the third directional antenna 308, and the fourth directional antenna 310 to transmit the RF signal 312 at different power levels to optimize RF coverage throughout the non-circular-shaped coverage area 330.

One approach for configuring the first directional antenna 304, the second directional antenna 306, the third directional antenna 308, and the fourth directional antenna 310 in the multiple antenna assembly 300 in FIG. 3B to transmit the RF signal 312 at different power levels is to employ a variety of directional antennas with different radiation patterns. For example, the first directional antenna 304 and the third directional antenna 308 could be selected to have an appropriate first antenna pattern that can effectively cover the width 336 of the non-circular-shaped coverage area 330. Similarly, the second directional antenna 306 and the fourth directional antenna 310 could be selected to have an appropriate second antenna pattern that can effectively cover the length 334 of the non-circular-shaped coverage area 330. However, this design approach requires a designer to use a variety of directional antennas to service a deployment site having coverage areas of different dimensions. In addition, once the directional antennas 304, 306, 308, 310 are selected and mounted for each coverage area, any optimization of the radiation pattern requires either changing the orientation of the antenna for each coverage area or choosing a different directional antenna with a different radiation pattern. In this regard, it may be desirable to use software commands to shape signal strength patterns around the multiple antenna assembly 300 to optimize RF coverage throughout the non-circular-shaped coverage area 330.

Figure 4:
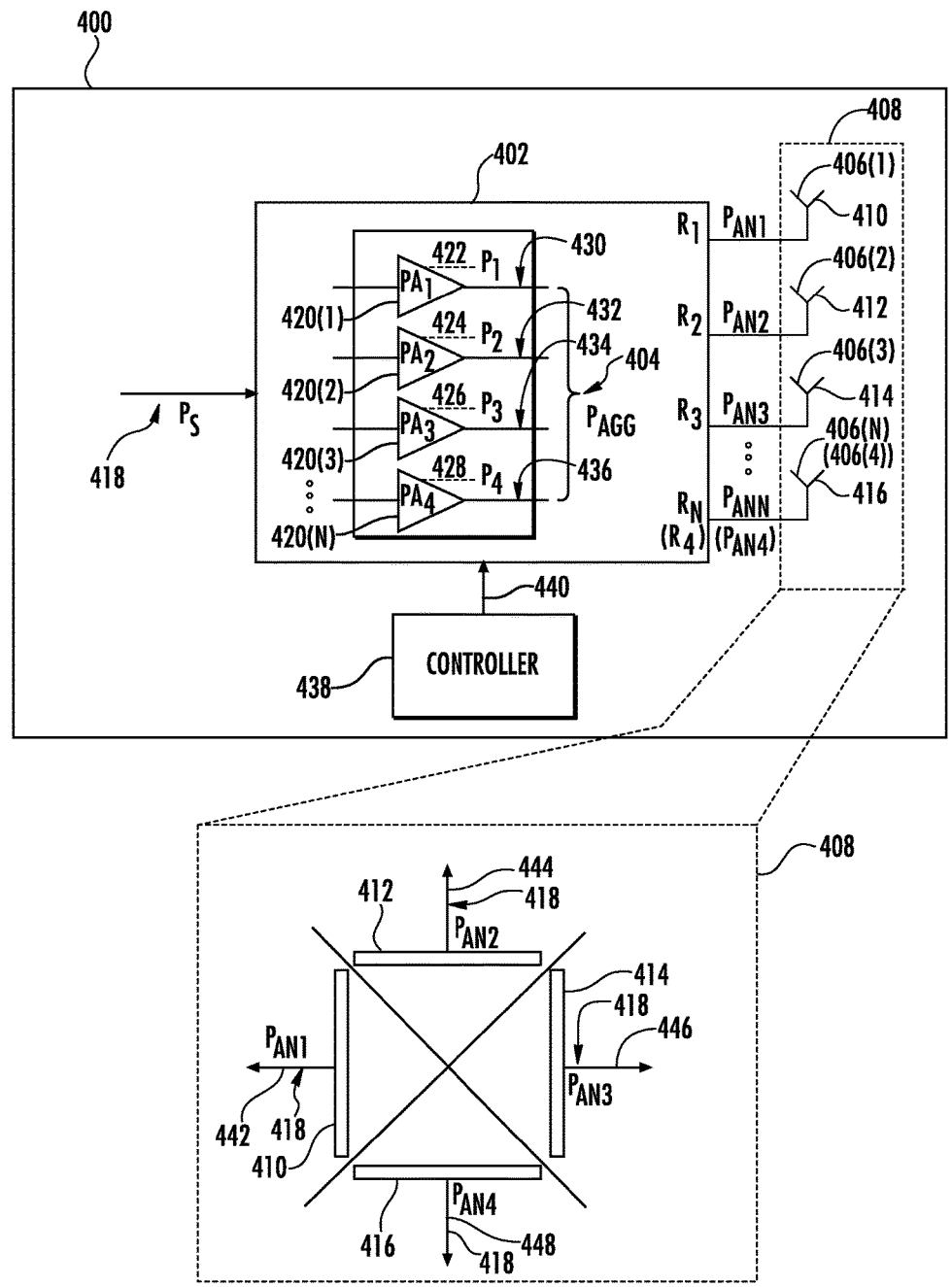
FIG. 4 is a schematic diagram of an exemplary remote antenna unit (RAU) in which a power generation circuit is configured to generate a power output having an aggregated power, and allocate the aggregated power between a plurality of directional antennas based on a power allocation scheme.

In this regard, FIG. 4 is a schematic diagram of an exemplary RAU 400 that can be provided in a WDS, such as a DAS, to distribute communications signals between a signal source(s) and remote coverage areas. The RAU 400 includes a power generation circuit 402 that is configured to generate a power output 404 having an aggregated power $P_{AGG}$. The power generation circuit 402 is also configured to allocate this aggregated power $P_{AGG}$ between a plurality of directional antennas 406(1)-406(N) based on a power allocation scheme. For the convenience of illustration and description, in a non-limiting example, the RAU 400 is shown hereinafter to include a multiple antenna assembly 408. The multiple antenna assembly 408 includes a first directional antenna 410, a second directional antenna 412, a third directional antenna 414, and a fourth directional antenna 416. The first directional antenna 410, the second directional antenna 412, the third directional antenna 414, and the fourth directional antenna 416 are disposed according to a rectangular-shaped arrangement. It shall be appreciated that the multiple antenna assembly 408 may include more or less than the first directional antenna 410, the second directional antenna 412, the third directional antenna 414, and the fourth directional antenna 416. For example, the multiple antenna assembly 408 can be configured to include three (3) directional antennas disposed according to a triangular-shaped arrangement, or five (5) directional antennas disposed according to a pentagonal-shaped arrangement. It shall also be appreciated that the configuration and operation principles of the power generation circuit 402 are applicable to any number of directional antennas employed in the multiple antenna assembly 408.

With continuing reference to FIG. 4, the power generation circuit 402 receives a power signal 418 having a predetermined power $P_S$. In a non-limiting example, the power signal 418 is a downlink communications signal 418, and the predetermined power $P_S$ is a power level at which the downlink communications signal 418 is received at the RAU 400. The predetermined power $P_S$ in the power signal 418 may be changed dynamically according to momentary characteristics and load of the power signal 418. The power generation circuit 402 includes a plurality of power amplifiers 420(1)-420(N). For the convenience of illustration and reference, the power generation circuit 402 is shown hereinafter to include a first power amplifier 422, a second power amplifier 424, a third power amplifier 426, and a fourth power amplifier 428. The first power amplifier 422 is configured to amplify the predetermined power $P_S$ to generate a first power output 430 having a first output power $P_1$. The second power amplifier 424 is configured to amplify the predetermined power $P_S$ to generate a second power output 432 having a second output power $P_2$. The third power amplifier 426 is configured to amplify the predetermined power $P_S$ to generate a third power output 434 having a third output power $P_3$. The fourth power amplifier 428 is configured to amplify the predetermined power $P_S$ to generate a fourth power output 436 having a fourth output power $P_4$. In this regard, the power output 404 includes the first power output 430, the second power output 432, the third power output 434, and the fourth power output 436. Accordingly, the aggregated power $P_{AGG}$ includes the first output power $P_1$, the second output power $P_2$, the third output power $P_3$, and the fourth output power $P_4$. It shall be appreciated that discussions of the power generation circuit 402 with reference to the first power amplifier 422, the second power amplifier 424, the third power amplifier 426, and the fourth power amplifier 428 are applicable to the power amplifiers 420(1)-420(N).

The RAU 400 includes a controller 438 communicatively coupled to the power generation circuit 402 via a connection path 440. In a non-limiting example, the controller 438 is a microprocessor, a digital-signal processor (DSP), a microcontroller, a Field Programmable Gate Array (FPGA), a Field-Programmable Analog Array (FPAA), a Programmable Logic Device (PLD), and/or an Application Specific Integrated Circuit (ASIC). The controller 438 is configured to instruct the power generation circuit 402 to allocate the aggregated power $P_{AGG}$ between the first directional antenna 410, the second directional antenna 412, the third directional antenna 414, and the fourth directional antenna 416 based on a power allocation scheme.

It shall be appreciated that the power allocation scheme discussed herein can be used to divide the aggregated power $P_{AGG}$ into a plurality of allocated powers $P_{AN1}$-$P_{ANN}$ based on a plurality of assigned power ratios $R_1$-$R_N$, respectively. In a non-limiting example, the power allocation scheme includes assigned power ratios $R_1$-$R_4$ for the first directional antenna 410, the second directional antenna 412, the third directional antenna 414, and the fourth directional antenna 416, respectively. Each of the assigned power ratios $R_1$-$R_4$ specifies a percentage of the aggregated power $P_{AGG}$ to be allocated to a respective directional antenna among the first directional antenna 410, the second directional antenna 412, the third directional antenna 414, and the fourth directional antenna 416. In this regard, the controller 438 can instruct the power generation circuit 402 to divide the aggregated power $P_{AGG}$ into respective allocated powers $P_{AN1}$-$P_{ANN}$ for the first directional antenna 410, the second directional antenna 412, the third directional antenna 414, and the fourth directional antenna 416 based on the assigned power ratios $R_1$-$R_4$. For the convenience of illustration and discussion, the allocated powers $P_{AN1}$-$P_{ANN}$ are shown to include a first allocated power $P_{AN1}$ for the first directional antenna 410, a second allocated power $P_{AN2}$ for the second directional antenna 412, a third allocated power $P_{AN3}$ for the third directional antenna 414, and a fourth allocated power $P_{AN4}$ for the fourth directional antenna 416. The first directional antenna 410, the second directional antenna 412, the third directional antenna 414, and the fourth directional antenna 416 then transmit the downlink communications signal 418 at the first allocated power $P_{AN1}$, the second allocated power $P_{AN2}$, the third allocated power PANS, and the fourth allocated power $P_{AN4}$, respectively.

The power allocation scheme can be determined by taking into consideration the real deployment environment of the RAU 400. For example, the power allocation scheme can be determined based on such factors as the shape and dimension of an intended coverage area (e.g., the non-circular-shaped coverage area 330 of FIG. 3B), coverage and performance requirements in the intended coverage area, neighboring coverage area configuration requirements, and so on. By allocating the aggregated power $P_{AGG}$ between the first directional antenna 410, the second directional antenna 412, the third directional antenna 414, and the fourth directional antenna 416 based on the power allocation scheme, it is possible to programmably control radiation patterns and transmission powers of the first directional antenna 410, the second directional antenna 412, the third directional antenna 414, and the fourth directional antenna 416 in the RAU 400. As a result, it is possible to provide optimized RF coverage throughout the intended coverage area of the RAU 400 without preconfiguring the radiation patterns and transmission powers of the first directional antenna 410, the second directional antenna 412, the third directional antenna 414, and the fourth directional antenna 416.

Figure 5:
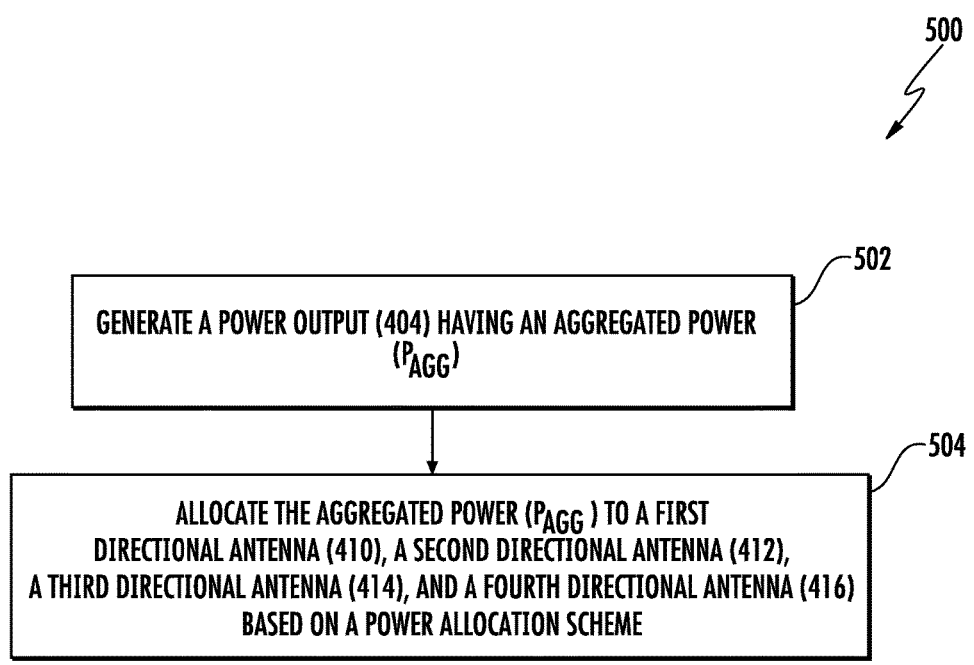
FIG. 5 is a flowchart of an exemplary process that can be employed by a controller in the RAU of FIG. 4 for allocating the aggregated power between the directional antennas.

The controller 438 can allocate the aggregated power $P_{AGG}$ between the first directional antenna 410, the second directional antenna 412, the third directional antenna 414, and the fourth directional antenna 416 based on a process. In this regard, FIG. 5 is a flowchart of an exemplary process 500 than can be employed by the controller 438 in the RAU 400 of FIG. 4 for allocating the aggregated power $P_{AGG}$ between the first directional antenna 410, the second directional antenna 412, the third directional antenna 414, and the fourth directional antenna 416. According to the exemplary process 500, the power generation circuit 402 generates the power output 404 having the aggregated power $P_{AGG}$ (block 502). The controller 438 instructs the power generation circuit 402 to allocate the aggregated power $P_{AGG}$ to the first directional antenna 410, the second directional antenna 412, the third directional antenna 414, and the fourth directional antenna 416 based on the power allocation scheme (block 504).

With reference back to FIG. 4, in a non-limiting example, the assigned power ratios $R_1$-$R_4$ may be 5%, 45%, 5%, and 45%, respectively. As such, if the aggregated power $P_{AGG}$ is one hundred milliwatts (100 mW) for example, the first allocated power $P_{AN1}$, the second allocated power $P_{AN2}$, the third allocated power $P_{AN3}$, and the fourth allocated power $P_{AN4}$ to the first directional antenna 410, the second directional antenna 412, the third directional antenna 414, and the fourth directional antenna 416 will be 5 mW, 45 mW, 5 mW, and 45 mW, respectively. The relationship between the aggregated power $P_{AGG}$ and the allocated powers $P_{AN1}$, $P_{AN2}$, $P_{AN3}$, $P_{AN4}$ can be expressed in the equation (Eq. 1) below.

$$P_{AGG}=P_1+P_2+P_3+P_4=P_{AN1}+P_{AN2}+P_{AN3}+P_{AN4}-P_{LOSS} \quad \text{(Eq. 1)}$$

In the equation (Eq. 1) above, $P_1$, $P_2$, $P_3$, and $P_4$ represent the first output power the second output power $P_2$, the third output power $P_3$, and the fourth output power $P_4$ generated by the first power amplifier 422, the second power amplifier 424, the third power amplifier 426, and the fourth power amplifier 428, respectively. $P_{LOSS}$ represents power loss (e.g., insertion loss) resulting from the power generation circuit 402. Accordingly, a generalized relationship between the aggregated power $P_{AGG}$ and the allocated powers $P_{AN1}$-$P_{ANN}$ can be expressed in the equation (Eq. 2) below.

$$P_{AGG}=P_{AN1}+P_{AN2}+P_{AN3}+ \ldots P_{AN4}-P_{LOSS} \quad \text{(Eq. 2)}$$

With continuing reference to FIG. 4, the first directional antenna 410 is configured to transmit the downlink communications signal 418 at the first allocated power $P_{AN1}$ in a first radiation direction 442. The second directional antenna 412 is configured to transmit the downlink communications signal 418 at the second allocated power $P_{AN2}$ in a second radiation direction 444. The third directional antenna 414 is configured to transmit the downlink communications signal 418 at the third allocated power $P_{AN3}$ in a third radiation direction 446. The fourth directional antenna 416 is configured to transmit the downlink communications signal 418 at the fourth allocated power $P_{AN4}$ in a fourth radiation direction 448.

In a non-limiting example, each of the first directional antenna 410, the second directional antenna 412, the third directional antenna 414, and the fourth directional antenna 416 is a 90° directional antenna. Accordingly, the first radiation direction 442 of the first directional antenna 410 substantially opposes the third radiation direction 446 of the third directional antenna 414. Likewise, the second radiation direction 444 of the second directional antenna 412 substantially opposes the fourth radiation direction 448 of the fourth directional antenna 416. Further, the second radiation direction 444 of the second directional antenna 412 is substantially orthogonal (i.e., perpendicular) to the first radiation direction 442 of the first directional antenna 410 and third radiation direction 446 of the third directional antenna 414. Accordingly, the fourth radiation direction 448 of the fourth directional antenna 416 is also substantially orthogonal (i.e., perpendicular) to the first radiation direction 442 of the first directional antenna 410 and third radiation direction 446 of the third directional antenna 414.

In another non-limiting example, to optimize RF coverage throughout the non-circular-shaped coverage area 330 of FIG. 3B, the assigned power ratio $R_1$ is configured to equal the assigned power ratio $R_3$. Accordingly, the first allocated power $P_{AN1}$ and the third allocated power $P_{AN3}$ are substantially equal. Similarly, the assigned power ratio $R_2$ is configured to equal the assigned power ratio $R_4$. Accordingly, the second allocated power $P_{AN2}$ and the fourth allocated power $P_{AN4}$ are substantially equal. If the assigned power ratio $R_1$ is less than the assigned power ratio $R_2$, the first allocated power $P_{AN1}$ and the third allocated power $P_{AN3}$ will be less than the second allocated power $P_{AN2}$ and the fourth allocated power $P_{AN4}$. As a result, the multiple antenna assembly 408 in the RAU 400 can effectively cover the length 334 and the width 336 of the non-circular-shaped coverage area 330.

Figure 6:
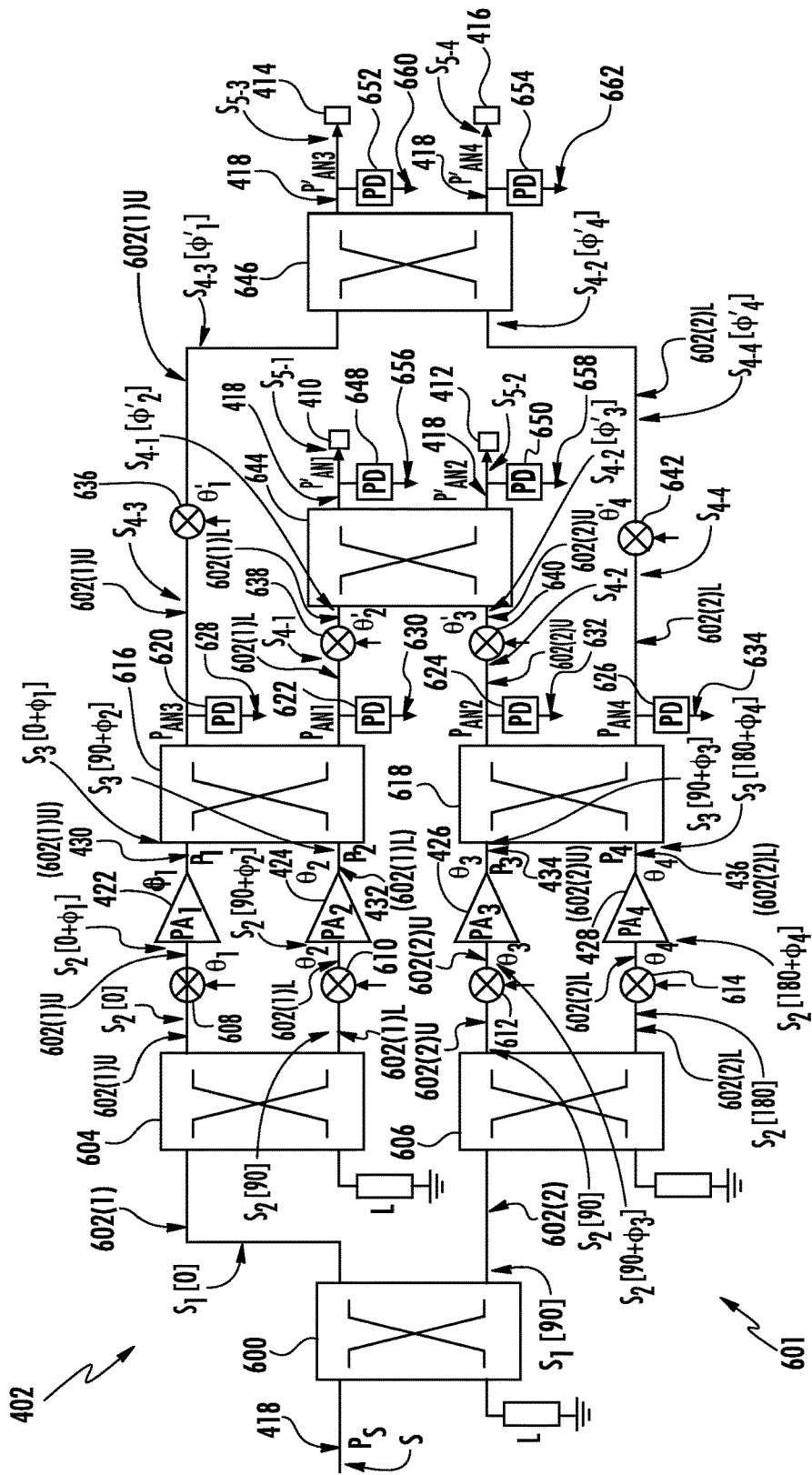
FIG. 6 is a schematic diagram providing an exemplary illustration of the power generation circuit of FIG. 4 configured to generate the power output having the aggregated power and allocate the aggregated power between the directional antennas based on the power allocation scheme.

The aggregated power $P_{AGG}$ can be allocated between the first directional antenna 410, the second directional antenna 412, the third directional antenna 414, and the fourth directional antenna 416 based primarily on a phase shifting means. As discussed in more detail below, signals provided to the first directional antenna 410, the second directional antenna 412, the third directional antenna 414, and the fourth directional antenna 416 could be combinations of phase-shifted signals that undergo constructive and destructive interference to allocate the desired power to the first directional antenna 410, the second directional antenna 412, the third directional antenna 414, and the fourth directional antenna 416. To help understand the configuration and operation principles of employing the phase shifting means in the power generation circuit 402 for allocating the first allocated power $P_{AN1}$, the second allocated power $P_{AN2}$, the third allocated power $P_{AN3}$, and the fourth allocated power $P_{AN4}$ to the first directional antenna 410, the second directional antenna 412, the third directional antenna 414, and the fourth directional antenna 416, respectively, FIG. 6 is discussed next. In this regard, FIG. 6 is a schematic diagram providing an exemplary illustration of the power generation circuit 402 of FIG. 4 configured to generate the power output 404 having the aggregated power $P_{AGG}$, and allocate the aggregated power $P_{AGG}$ between the directional antennas 406(1)-406(N). Common elements between FIGS. 4 and 6 are shown therein with common element numbers and will not be re-described herein.

With reference to FIG. 6, the power generation circuit 402 includes a splitter combiner 600 in the form of a hybrid combiner. The splitter combiner 600 is configured to receive the downlink communications signal 418 having the predetermined power $P_S$ at a first input port. A second input port of the splitter combiner 600 is terminated with an external fixed load, such as a fifty (50) ohm resistor for example. In this manner, the splitter combiner 600 acts as a power divider. In this regard, the hybrid combiner 600 is configured to split the power of the downlink communications signal 418 into a first downlink communications signal 602(1) and a second downlink communications signal 602(2) in quadrature (i.e., phase shifted 90° apart) from each other. With the total power of the downlink communications signal 418 being Ps, and the input voltage of the downlink communications signal 418 being 's':

$$Ps = S^2$$

Thus, with a voltage amplitude of 'S' of the downlink communications signal 418 having relative phase shift of φx, the splitter combiner 600 is configured to generate the first downlink communications signal 602(1) of voltage $S_1[0]$ equal to the following, shown as $S_1[0]$ in FIG. 6:

$$\frac{S}{\sqrt{2}} \lfloor \varphi x \rfloor,$$

where φx is equal to 0°, and
the second downlink communications signal 602(2) of voltage $S_1[90]$ the following, shown as $S_1[90]$ in FIG. 6:

$$\frac{S}{\sqrt{2}} \lfloor \varphi x + 90 \rfloor.$$

With continuing reference to FIG. 6, a first splitter combiner 604 and a second splitter combiner 606 are provided. Again, a first splitter combiner 604 and a second splitter combiner 606 are hybrid combiners in this example with one of their input ports terminated like the splitter combiner 600 to function as power dividers. The first splitter combiner 604 receives the first downlink communications signal 602(1). The second splitter combiner 606 receives the second downlink communications signal 602(2). The first splitter combiner 604 splits the first downlink communications signal 602(1) into an upper first downlink communications signal 602(1)U and a lower first downlink communications signal 602(1)L. Like the splitter combiner 600, because phase of the first downlink communications signal 602(1) input into the first splitter combiner 604 is 0° relative to the phase of the downlink communications signal 418, the upper first downlink communications signal 602(1)U has a phase shift of 0° relative to phase of the downlink communications signal 418, whereas the lower first downlink communications signal 602(1)L is phase shifted 90° from the downlink communications signal 418. Further, assuming the voltage amplitude $S_1[0]$ of the first downlink communications signal 602(1), the voltage amplitude $S_2$ of the upper first downlink communications signal 602(1)U is equal to the following, shown as voltage signal $S_2[0]$ in FIG. 6:

$$\frac{S_1}{\sqrt{2}} \lfloor \varphi x \rfloor,$$

where φx is equal to 0°, and
the voltage amplitude $S_2$ of the upper first downlink communications signal 602(1)U is equal to the following, shown as voltage signal $S_2[90]$ in FIG. 6:

$$\frac{S_1}{\sqrt{2}} \lfloor \varphi x + 90 \rfloor.$$

Similarly, with continuing reference to FIG. 6, the second splitter combiner 606 splits the second downlink communications signal 602(2) into an upper second downlink communications signal 602(2)U and a lower second downlink communications signal 602(2)L. Like the splitter combiner 600, because phase of the second downlink communications signal 602(2) input into the second splitter combiner 606 is 90° relative to the phase of the downlink communications signal 418, the upper second downlink communications signal 602(2)U has a phase shift of 90° relative to phase of the downlink communications signal 418, whereas the lower second downlink communications signal 602(1)L is phase shifted 180° from the downlink communications signal 418. Further, assuming the voltage amplitude $S_1[90]$ of the second downlink communications signal 602(2), the voltage amplitude $S_2$ of the upper second downlink communications signal 602(2)U is equal to the following, shown as voltage signal $S_2[90]$ in FIG. 6:

$$\frac{S_1}{\sqrt{2}} \lfloor \varphi x + 90 \rfloor,$$

and the voltage amplitude $S_2$ of the lower second downlink communications signal 602(2)L is equal to the following, shown as voltage signal $S_2[180]$ in FIG. 6:

$$\frac{S_1}{\sqrt{2}} \lfloor \varphi x + 180 \rfloor.$$

With continuing reference to FIG. 6, the power generation circuit 402 includes a first phase shifter 608, a second phase shifter 610, a third phase shifter 612, and a fourth phase shifter 614. The first phase shifter 608, the second phase shifter 610, the third phase shifter 612, and the fourth phase shifter 614 provide the phase shifting means in the power generation circuit 402. The first phase shifter 608 is configured to phase-shift the upper first downlink communications signal 602(1)U to a first phase $\theta_1$, shown as voltage signal $S_2[0+\Phi 1]$. The second phase shifter 610 is configured to phase-shift the lower first downlink communications signal 602(1)L to a second phase $\theta_2$, shown as voltage signal $S_2[90+\Phi 2]$. The third phase shifter 612 is configured to phase-shift the upper second downlink communications signal 602(2)U to a third phase $\theta_3$, shown as voltage signal $S_2[90+\Phi 3]$. The fourth phase shifter 614 is configured to phase-shift the lower second downlink communications signal 602(2)L to a fourth phase $\theta_4$, shown as voltage signal $S_2[180+\Phi 4]$.

The first phase shifter 608, the second phase shifter 610, the third phase shifter 612, and the fourth phase shifter 614 can be configured to shift phase to generate the first phase $\theta_1$, the second phase $\theta_2$, the third phase $\theta_3$, and the fourth phase $\theta_4$ in any desirable combination. In this regard, as discussed in more detail below, the first phase $\theta_1$ of the upper first downlink communications signal 602(1)U, the second phase $\theta_2$ of the lower first downlink communications signal 602(1)L, the third phase $\theta_3$ of the upper second downlink communications signal 602(2)U, and the fourth phase $\theta_4$ of the lower second downlink communications signal 602(2)L are programmable controlled to control the allocation of the aggregated power $P_{AGG}$ between the first directional antenna 410, the second directional antenna 412, the third directional antenna 414, and the fourth directional antenna 416. In the above example, the splitter combiner 600, the first splitter combiner 604, and the second splitter combiner 606 are hybrid splitter combiners, but could be other type of splitter combiners, such as a Wilkinson splitter combiners. Regardless of how the splitter combiner 600, the first splitter combiner 604, and the second splitter combiner 606 are implemented, the power generation circuit 402 is configured to configure allocation of the aggregated power $P_{AGG}$ between the first directional antenna 410, the second directional antenna 412, the third directional antenna 414, and the fourth directional antenna 416 based on the programming control of the phase shifting provided by the first phase shifter 608, the second phase shifter 610, the third phase shifter 612, and the fourth phase shifter 614 in this example.

With continuing reference to FIG. 6, the first power amplifier 422 amplifies the upper first downlink communications signal 602(1)U to generate the first power output 430 having the first output power $P_1$, shown as voltage signal $S_3[0+\Phi 1]$ The first power output 430 is similar to the upper first downlink communications signal 602(1)U in the first phase $\theta_1$, but has the first output power $P_1$. As such, the first power output 430 is also referred to as the upper first downlink communications signal 602(1)U. The second power amplifier 424 amplifies the lower first downlink communications signal 602(1)L to generate the second power output 432 having the second output power $P_2$, shown as voltage signal $S_3[90+\Phi 2]$. The second power output 432 is similar to the lower first downlink communications signal 602(1)L in the second phase $\theta_2$, but has the second output power $P_2$. As such, the second power output 432 is also referred to as the lower first downlink communications signal 602(1)L. The third power amplifier 426 amplifies the upper second downlink communications signal 602(2)U to generate the third power output 434 having the third output power $P_3$. The third power output 434 is similar to the upper second downlink communications signal 602(2)U in the third phase $\theta_3$, but has the third output power $P_3$, shown as voltage signal $S_3[90+\Phi 3]$. As such, the third power output 434 is also referred to as the upper second downlink communications signal 602(2)U. The fourth power amplifier 428 amplifies the lower second downlink communications signal 602(2)L to generate the fourth power output 436 having the fourth output power $P_4$, shown as voltage signal $S_3[180+\Phi 4]$. The fourth power output 436 is similar to the lower second downlink communications signal 602(2)L in the fourth phase $\theta_4$, but has the fourth output power $P_4$. As such, the fourth power output 436 is also referred to as the lower second downlink communications signal 602(2)L.

With continuing reference to FIG. 6, the power generation circuit 402 also includes an upper splitter combiner 616 and a lower splitter combiner 618, both of which are hybrid combiners in this example. The upper splitter combiner 616 is configured to allocate the first output power $P_1$ to the third allocated power $P_{AN3}$ from the upper first downlink communications signal 602(1)U and the lower first downlink communications signal 602(1)L, as follows:

$$P_{AN3} = S_3^2$$

The phase-shifted voltage of the third allocated power $P_{AN3}$ shown as voltage signal $S_{4\text{-}3}$, is as is follows:

$$\frac{S_3}{\sqrt{2}} \lfloor 0 + \Phi 1 + 0 \rfloor + \frac{S_3}{\sqrt{2}} \lfloor 90 + \Phi 2 + 90 \rfloor$$

With continuing reference to FIG. 6, the upper splitter combiner 616 is also configured to allocate the second output power $P_2$ to the first allocated power $P_{AN1}$ from the upper first downlink communications signal 602(1)U and the lower first downlink communications signal 602(1)L, as follows:

$$P_{AN1} = S_3^2$$

The phase-shifted voltage of the first allocated power $P_{AN1}$ shown as voltage signal $S_{4\text{-}1}$, is as follows:

$$\frac{S_3}{\sqrt{2}} \lfloor 0 + \Phi 1 + 90 \rfloor + \frac{S_3}{\sqrt{2}} \lfloor 90 + \Phi 2 + 0 \rfloor$$

With continuing reference to FIG. 6, the lower splitter combiner 618 is configured to allocate the third output power $P_3$ to the second allocated power $P_{AN2}$ from the upper second downlink communications signal 602(2)U and the lower second downlink communications signal 602(2)L, as follows:

$$P_{AN2} = S_3^2$$

The phase-shifted voltage of the second allocated power $P_{AN2}$ shown as voltage signal $S_{4\text{-}2}$, is as follows:

$$\frac{S_3}{\sqrt{2}} \lfloor 90 + \Phi 3 + 0 \rfloor + \frac{S_3}{\sqrt{2}} \lfloor 180 + \Phi 4 + 90 \rfloor$$

With continuing reference to FIG. 6, the lower splitter combiner 618 is also configured to allocate the fourth output power $P_4$ to the fourth allocated power $P_{AN4}$ from the upper second downlink communications signal 602(2)U and the lower second downlink communications signal 602(2)L, as follows:

$$P_{AN4} = S_3^2$$

The phase-shifted voltage of the fourth allocated power $P_{AN4}$ shown as voltage signal $S_{4-4}$, is as follows:

$$\frac{S_3}{\sqrt{2}} \lfloor 90 + \Phi 3 + 90 \rfloor + \frac{S_3}{\sqrt{2}} \lfloor 180 + \Phi 4 \rfloor$$

Thus, by controlling the phase shifting of the phase shifters 608-614 according to the respective first phase $\theta_1$, the second phase $\theta_2$, the third phase $\theta_3$ and the fourth phase $\theta_4$ shown in FIG. 6, the aggregated power $P_S$ of the downlink communications signal 418 to the allocated powers $P_{AN1}$-$P_{AN4}$ is divided between the first directional antenna 410, the second directional antenna 412, the third directional antenna 414, and the fourth directional antenna 416, respectively according to the desired phase shift to provide the desired antenna coverage. As discussed above, the phase shifters 608-614 are controlled to provide the phase shifting of the first phase $\theta i$, the second phase $\theta_2$, the third phase $\theta_3$, and the fourth phase $\theta_4$ in this example determining the allocation of the aggregated power $P_S$ between the first directional antenna 410, the second directional antenna 412, the third directional antenna 414, and the fourth directional antenna 416. However, it may be possible for some degree of gain imbalance to exist between one or more of the first allocated power $P_{AN1}$, the second allocated power $P_{AN2}$, the third allocated power $P_{AN3}$, and the fourth allocated power $P_{AN4}$. As such, it may be desirable to compensate the gain imbalances with a secondary power adjustment means.

In this regard, with continuing reference to FIG. 6, the power generation circuit 402 can be further configured to include a first power detector 620, a second power detector 622, a third power detector 624, and a fourth power detector 626 for measuring the output allocated powers $P_{AN1}$-$P_{AN4}$. The measured output power of the output allocated powers $P_{AN1}$-$P_{AN4}$ by the power detectors 620-626 can be used by controller 438 to detect gain imbalances between the first allocated power $P_{AN1}$, the second allocated power $P_{AN2}$, the third allocated power $P_{AN3}$, and the fourth allocated power $P_{AN4}$ The controller 438 monitors power detection signals 628, 630, 632, 634 from the first power detector 620, the second power detector 622, the third power detector 624, and the fourth power detector 626, respectively. The controller 438 can use this information to control the phase-shifting provided by the phase shifters 608-614 based on the measured output allocated powers $P_{AN1}$-$P_{AN4}$ to achieve the desired power allocation at the directional antennas 410-416. In this regard, the first power detector 620 monitors the third allocated power $P_{AN3}$ of the upper first downlink communications signal 602(1)U to provide for the third allocated power $P_{AN3}$ to correspond to the assigned power ratio $R_3$ of the power allocation scheme of FIG. 4. The second power detector 622 monitors the first allocated power $P_{AN1}$ of the lower first downlink communications signal 602(1)L to provide for the first allocated power $P_{AN1}$ to correspond to the assigned power ratio of the power allocation scheme of FIG. 4. The third power detector 624 monitors the second allocated power $P_{AN2}$ of the upper second downlink communications signal 602(2)U to provide for the second allocated power $P_{AN2}$ to correspond to the assigned power ratio $R_2$ of the power allocation scheme of FIG. 4. The fourth power detector 626 monitors the fourth allocated power $P_{AN4}$ of the lower second downlink communications signal 602(2)L to provide for the fourth allocated power $P_{AN4}$ to correspond to the assigned power ratio $R_4$ of the power allocation scheme of FIG. 4.

With continuing reference to FIG. 6, the first power amplifier 422, the second power amplifier 424, the third power amplifier 426, and the fourth power amplifier 428 can also be provided in the power generation circuit 402 as a secondary method to adjust and allocate power of the downlink communications signal 418. In a non-limiting example, each of the first power amplifier 422, the second power amplifier 424, the third power amplifier 426, and the fourth power amplifier 428 is initially set to a respective maximum power. Upon detection of the gain imbalance between the first allocated power $P_{AN1}$, the second allocated power $P_{AN2}$, the third allocated power $P_{AN3}$, and the fourth allocated power $P_{AN4}$, the controller 438 may provide adjustments to the first power amplifier 422, the second power amplifier 424, the third power amplifier 426, and/or the fourth power amplifier 428 to compensate the gain imbalances between the first allocated power $P_{AN1}$, the second allocated power $P_{AN2}$, the third allocated power $P_{AN3}$, and the fourth allocated power $P_{AN4}$, thus ensuring proper power allocation between the third directional antenna 414, the first directional antenna 410, the second directional antenna 412, and the fourth directional antenna 416 according to the power allocation scheme. In a non-limiting example, the controller 438 can adjust the third power amplifier 426, the first power amplifier 422, the second power amplifier 424, and/or the fourth power amplifier 428 by adjusting respective amplifier adjustable gain or other means (e.g., via controllable/adjustable attenuators added before respective power amplifiers.

The power generation circuit 402 also includes a first secondary phase shifter 636 configured to further phase-shift the upper first downlink communications signal 602(1)U to an adjusted first phase $\theta'_1$, shown as voltage signal $S_{4-3}[\Phi'1]$. The power generation circuit 402 includes a second secondary phase shifter 638 configured to further phase-shift the lower first downlink communications signal 602(1)L to an adjusted second phase $\theta'_2$, shown as voltage signal $S_{4-1}[\Phi'2]$. The power generation circuit 402 includes a third secondary phase shifter 640 configured to further phase-shift the upper second downlink communications signal 602(2)U to an adjusted third phase $\theta'_3$, shown as voltage signal $S_{4-2}[\Phi'3]$. The power generation circuit 402 includes a fourth secondary phase shifter 642 configured to further phase-shift the lower second downlink communications signal 602(2)L to an adjusted fourth phase $\theta'_4$, shown as voltage signal $S_{4-4}[\Phi'4]$.

The power generation circuit 402 also includes a first secondary splitter combiner 644 and a second secondary splitter combiner 646, both of which are hybrid combiners in this example. The first secondary splitter combiner 644 is configured to allocate first allocated power $P_{AN1}$ from the lower first downlink communications signal 602(1)L and the from the upper second downlink communications signal 602(2)U, as follows:

$$P'_{AN1}=S_{4\text{-}1} \cdot S_{4\text{-}2}$$

The phase-shifted voltage of the adjusted first allocated power $P'_{AN1}$ shown as voltage signal $S_{5\text{-}1}$, is as follows:

$$\frac{S_{4\text{-}1}}{\sqrt{2}}\lfloor\Phi'2\rfloor + \frac{S_{4\text{-}2}}{\sqrt{2}}\lfloor\Phi'3+90\rfloor$$

The first secondary splitter combiner 644 is also configured to allocate second allocated power $P'_{AN2}$ from the lower first downlink communications signal 602(1)L and from the upper second downlink communications signal 602(2)U, as follows:

$$P'_{AN2}=S_{4\text{-}1} \cdot S_{4\text{-}2}$$

The phase-shifted voltage of the adjusted second allocated power $P'_{AN2}$ shown as voltage signal $S_{5\text{-}2}$, is as follows:

$$\frac{S_{4\text{-}1}}{\sqrt{2}}\lfloor\Phi'2+90\rfloor + \frac{S_{4\text{-}2}}{\sqrt{2}}\lfloor\Phi'3\rfloor$$

The second secondary splitter combiner 646 is configured to allocate third allocated power $P'_{AN3}$ from the upper first downlink communications signal 602(1)U and the from the lower second downlink communications signal 602(2)L, as follows:

$$P'_{AN3}=S_{4\text{-}3} \cdot S_{4\text{-}4}$$

The phase-shifted voltage of the adjusted third allocated power $P'_{AN3}$ shown as voltage signal $S_{5\text{-}3}$, is as follows:

$$\frac{S_{4\text{-}3}}{\sqrt{2}}\lfloor\Phi'1\rfloor + \frac{S_{4\text{-}4}}{\sqrt{2}}\lfloor\Phi'4+90\rfloor$$

The first secondary splitter combiner 644 is also configured to allocate fourth allocated power $P'_{AN4}$ from the upper first downlink communications signal 602(1)U and from the lower second downlink communications signal 602(2)L, as follows:

$$P'_{AN4}=S_{4\text{-}3} \cdot S_{4\text{-}4}$$

The phase-shifted voltage of the adjusted fourth allocated power $P'_{AN4}$ shown as voltage signal $S_{5\text{-}4}$, is as follows:

$$\frac{S_{4\text{-}3}}{\sqrt{2}}\lfloor\Phi'1+90\rfloor + \frac{S_{r\text{-}4}}{\sqrt{2}}\lfloor\Phi'4\rfloor$$

The allocated powers $P'_{AN1}$-$P'_{AN4}$ of the downlink communications signal 418 can be provided to the directional antennas 410-416 to provide the desired allocation power to the respective directional antennas 410-416 as controlled by the controller 438 controlling the phase shifting provided by the phase shifters 608-614.

With continuing reference to FIG. 6, the power generation circuit 402 further includes power detectors 648, 650, 652, 654 for measuring the output allocated powers $P'_{AN1}$-$P'_{AN4}$. The measured output power of the output allocated powers $P'_{AN1}$-$P'_{AN4}$ by the power detectors 648-654 can be used by controller 438 to detect gain imbalances between the first allocated power $P'_{AN1}$, the second allocated power $P'_{AN2}$, the third allocated power $P'_{AN3}$, and the fourth allocated power $P'_{AN4}$. The controller 438 monitors power detection signals 656, 658, 660, 662 from the power detectors 648, 650, 652, 654, respectively. The controller 438 can use this information to control the phase-shifting provided by the phase shifters 608-614 based on the measured output allocated powers PANT-$P_{AN4}$ to achieve the desired power allocation at the directional antennas 410-416. The controller 438 can also use this information for detecting the gain imbalances between the adjusted first allocated power $P'_{AN1}$, the adjusted second allocated power $P'_{AN2}$, the adjusted third allocated power $P'_{AN3}$, and the adjusted fourth allocated power $P'_{AN4}$. In a non-limiting example, each of the first power amplifier 422, the second power amplifier 424, the third power amplifier 426, and the fourth power amplifier 428 is initially set to a respective maximum power. Upon detection of the gain imbalance between the adjusted first allocated power $P'_{AN1}$, the adjusted second allocated power $P'_{AN2}$, the adjusted third allocated power $P'_{AN3}$, and the adjusted fourth allocated power $P'_{AN4}$, the controller 438 may provide adjustments to the first power amplifier 422, the second power amplifier 424, the third power amplifier 426, and/or the fourth power amplifier 428 to compensate the gain imbalances among between the adjusted third allocated power $P'_{AN3}$, the adjusted first allocated power $P'_{AN1}$, the adjusted second allocated power $P'_{AN2}$, and the adjusted fourth allocated power $P'_{AN4}$, thus ensuring proper power allocation between the third directional antenna 414, the first directional antenna 410, the second directional antenna 412, and the fourth directional antenna 416 according to the power allocation scheme. In a non-limiting example, the controller 438 can adjust the third power amplifier 426, the first power amplifier 422, the second power amplifier 424, and/or the fourth power amplifier 428 by adjusting respective amplifier adjustable gain or other means (e.g., via controllable/adjustable attenuators added before respective power amplifiers).

As previously discussed in FIG. 4, the power allocation scheme may be determined by taking into consideration the real deployment environment of the RAU 400. In this regard, FIGS. 7A-7D are schematic diagrams providing exemplary illustrations of determining the power allocation scheme for the RAU 400 of FIG. 4 based on intended coverage areas of the RAU 400. Common elements between FIGS. 4 and 7A-7D are shown therein with common element numbers and will not be re-described herein.

With reference to FIG. 7A, the first directional antenna 410, the second directional antenna 412, the third directional antenna 414, and the fourth directional antenna 416 are configured to provide RF coverage in a rectangular-shaped coverage area 700. The rectangular-shaped coverage area 700 has a length 702 and a width 704. The length 702 is substantially longer than the width 704. In a non-limiting example, the first directional antenna 410, the second directional antenna 412, the third directional antenna 414, and the fourth directional antenna 416 are mounted to a ceiling at one end 706 of the rectangular-shaped coverage area 700, with the first directional antenna 410 facing an opposite end 708 of the rectangular-shaped coverage area 700. In this regard, the first directional antenna 410 is configured to provide RF coverage up to the opposite end 708 of the rectangular-shaped coverage area 700. In contrast, minimal RF coverage is needed from the second directional antenna 412, the third directional antenna 414, and the fourth directional antenna 416. As such, in a non-limiting example, the controller 438 of FIG. 4 instructs the power generation circuit 402 of FIG. 4 to allocate ninety-seven milliwatts (97 mW), one milliwatt (1 mW), 1 mW, and 1 mW to the first directional antenna 410, the second directional antenna 412, the third directional antenna 414, and the fourth directional antenna 416, respectively. As a result, the first directional antenna 410 generates a radiation lobe 710 large enough to cover the length 702 of the rectangular-shaped coverage area 700. As a result, it is possible to optimize RF coverage in the rectangular-shaped coverage area 700.

With reference to FIG. 7B, the first directional antenna 410, the second directional antenna 412, the third directional antenna 414, and the fourth directional antenna 416 are configured to provide RF coverage in a rectangular-shaped coverage area 712. The rectangular-shaped coverage area 712 has a length 714 and a width 716. The length 714 is substantially longer than the width 716. In a non-limiting example, the first directional antenna 410, the second directional antenna 412, the third directional antenna 414, and the fourth directional antenna 416 are mounted to a ceiling at a mounting point 718. The mounting point 718 has a first distance 720 to one end 722 of the rectangular-shaped coverage area 712. The mounting point 718 has a second distance 724 to an opposite end 726 of the rectangular-shaped coverage area 712. The second distance 724 is longer than the first distance 720. The mounting point 718 has a third distance 728 to a first side 730 of the rectangular-shaped coverage area 712, and a fourth distance 732 to a second side 734 of the rectangular-shaped coverage area 712. The third distance 728 is substantially equal to the fourth distance 732. However, the third distance 728 and the fourth distance 732 are both shorter than the first distance 720.

Accordingly, in a non-limiting example, the controller 438 of FIG. 4 instructs the power generation circuit 402 of FIG. 4 to allocate sixty milliwatts (60 mW), ten milliwatts (10 mW), twenty milliwatts (20 mW), and 10 mW to the first directional antenna 410, the second directional antenna 412, the third directional antenna 414, and the fourth directional antenna 416, respectively. As a result, the first directional antenna 410 generates a first radiation lobe 736 large enough to reach the opposite end 726 of the rectangular-shaped coverage area 712. The second directional antenna 412 generates a second radiation lobe 738, which is substantially orthogonal to the first radiation lobe 736, large enough to reach the first side 730 of the rectangular-shaped coverage area 712. The third directional antenna 414 generates a third radiation lobe 740, which is substantially opposite of the first radiation lobe 736, large enough to reach the one end 722 of the rectangular-shaped coverage area 712. The fourth directional antenna 416 generates a fourth radiation lobe 742, which is substantially opposite of the second radiation lobe 738, large enough to reach the second side 734 of the rectangular-shaped coverage area 712. As a result, it is possible to optimize RF coverage in the rectangular-shaped coverage area 712.

With reference to FIG. 7C, the first directional antenna 410, the second directional antenna 412, the third directional antenna 414, and the fourth directional antenna 416 are configured to provide RF coverage in a rectangular-shaped coverage area 744. The rectangular-shaped coverage area 744 has a length 746 and a width 748. The length 746 is substantially longer than the width 748. In a non-limiting example, the first directional antenna 410, the second directional antenna 412, the third directional antenna 414, and the fourth directional antenna 416 are mounted to a ceiling at one end 750 of the rectangular-shaped coverage area 744, with the first directional antenna 410 facing an opposite end 752 of the rectangular-shaped coverage area 744. In this regard, the first directional antenna 410 is configured to provide RF coverage up to the opposite end 752 of the rectangular-shaped coverage area 744. The second directional antenna 412 and the fourth directional antenna 416 are configured to provide RF coverage to a first side 754 and a second side 756 of the rectangular-shaped coverage area 744, respectively. In contrast, minimal RF coverage is needed from the third directional antenna 414 to provide RF coverage to the one end 750. As such, in a non-limiting example, the controller 438 of FIG. 4 instructs the power generation circuit 402 of FIG. 4 to allocate eighty-nine milliwatts (89 mW), five milliwatts (5 mW), 1 mW, and 5 mW to the first directional antenna 410, the second directional antenna 412, the third directional antenna 414, and the fourth directional antenna 416, respectively. As a result, the first directional antenna 410 generates a radiation lobe 758 large enough to cover the length 746 of the rectangular-shaped coverage area 744. The second directional antenna 412 generates a radiation lobe 760, which is substantially orthogonal to the radiation lobe 758, large enough to reach the first side 754 of the rectangular-shaped coverage area 744. The fourth directional antenna 416 generates a radiation lobe 762, which is substantially orthogonal to the radiation lobe 758, large enough to reach the second side 756 of the rectangular-shaped coverage area 744. The third directional antenna 414 generates little radiation. As a result, it is possible to optimize RF coverage in the rectangular-shaped coverage area 744.

With reference to FIG. 7D, the first directional antenna 410, the second directional antenna 412, the third directional antenna 414, and the fourth directional antenna 416 are configured to provide RF coverage in a rectangular-shaped coverage area 764. The rectangular-shaped coverage area 764 has a length 766 and a width 768. The length 766 is substantially longer than the width 768. In a non-limiting example, the first directional antenna 410, the second directional antenna 412, the third directional antenna 414, and the fourth directional antenna 416 are mounted to a ceiling at a mounting point 770. The mounting point 770 is located at the center of the rectangular-shaped coverage area 764. As such, in a non-limiting example, the controller 438 of FIG. 4 instructs the power generation circuit 402 of FIG. 4 to allocate forty-five milliwatts (45 mW), 5 mW, 45 mW, and 5 mW to the first directional antenna 410, the second directional antenna 412, the third directional antenna 414, and the fourth directional antenna 416, respectively. As a result, the first directional antenna 410 and the third directional antenna 414 generate respective radiation lobes 772, 774 large enough cover the length 766 of the rectangular-shaped coverage area 764. The second directional antenna 412 and the fourth directional antenna 416 generate respective radiation lobes 776, 778 large enough cover the width 768 of the rectangular-shaped coverage area 764. As a result, it is possible to optimize RF coverage in the rectangular-shaped coverage area 764.

Figure 8A:
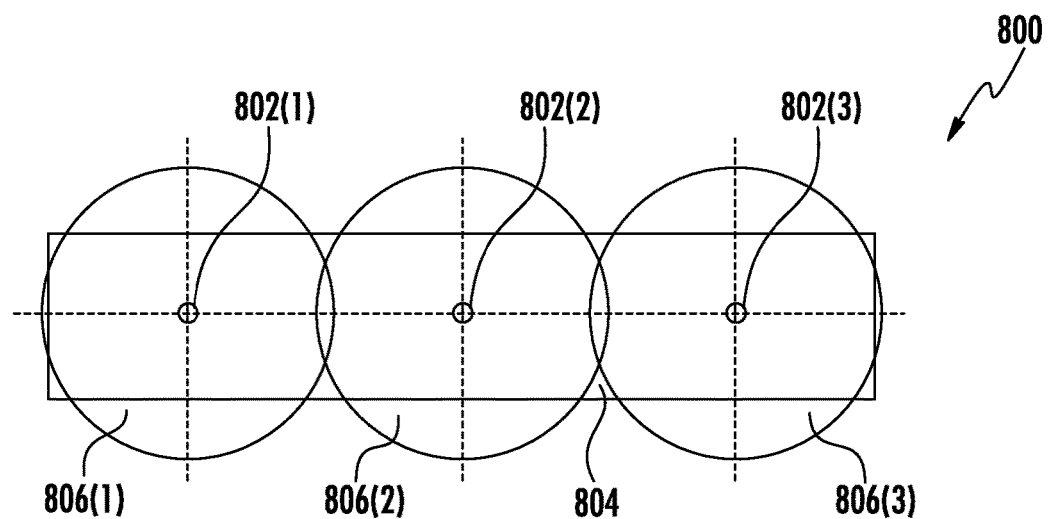
FIG. 8A is a schematic diagram illustrating a prior art deployment that employs a plurality of omnidirectional antennas to provide RF coverage in a rectangular-shaped coverage area.

As previously discussed in FIG. 2B, the omnidirectional antenna 214 transmits the electromagnetic signal 216 within the 360° radius 218 around the omnidirectional antenna 214. In this regard, FIG. 8A is a schematic diagram illustrating a prior art deployment 800 that employs a plurality of omnidirectional antennas 802(1)-802(3) to provide RF coverage in a rectangular-shaped coverage area 804. The omnidirectional antennas 802(1)-802(3) provide a plurality of substantially circular radiation footprints 806(1)-806(3), respectively.

As seen in FIG. 8A, in providing adequate service to the lengthwise section of the rectangular-shaped coverage area 804 (i.e., in the horizontal direction), each of the substantially circular radiation footprints 806(1)-806(3) is seen to extend beyond the boundaries of the rectangular-shaped coverage area 804 in the widthwise direction (i.e., in the vertical direction). That is, in boosting the power to the omnidirectional antennas 802(1)-802(3) to provide adequate service along the length of the rectangular-shaped coverage area 804, the omnidirectional antennas 802(1)-802(3) radiate power outside the rectangular-shaped coverage area 804 in the widthwise direction, thus leading to wasted radiation. If the radiation powers of the omnidirectional antennas 802(1)-802(3) are reduced to limit the substantially circular radiation footprints 806(1)-806(3) within the width of the rectangular-shaped coverage area 804 (i.e., to the top and bottom perimeters of the deployment area), then the substantially circular radiation footprints 806(1)-806(3) will not cover the length of the rectangular-shaped coverage area 804, thus leading to insufficient RF coverage in some parts of the rectangular-shaped coverage area 804.

Figure 8B:
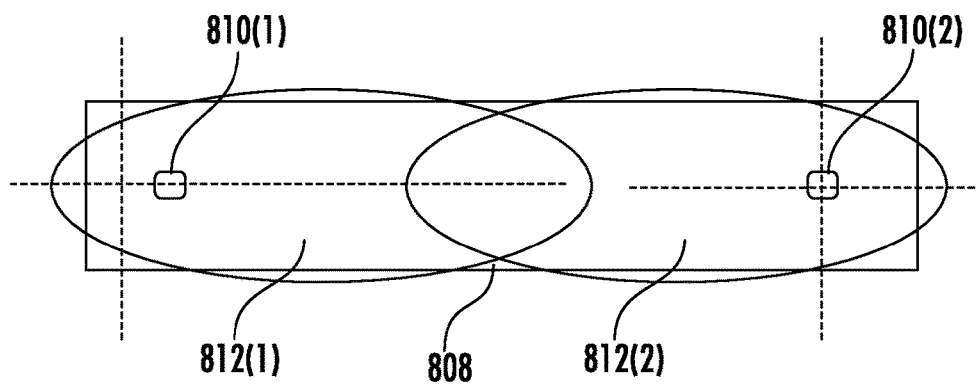
FIG. 8B is a schematic diagram providing an exemplary illustration of a rectangular-shaped coverage area served by a pair of RAUs employing directional antennas.

In contrast, FIG. 8B is a schematic diagram providing an exemplary illustration of a rectangular-shaped coverage area 808 served by a pair of RAUs 810(1), 810(2) employing directional antennas. The rectangular-shaped coverage area 808 is substantially similar to, or the same as, the rectangular-shaped coverage area 804 of FIG. 8A. The RAUs 810(1), 810(2) are the same as the RAU 400 of FIG. 4. In this regard, the RAUs 810(1), 810(2) each include the directional antennas 406(1)-406(N) of FIG. 4. By configuring the directional antennas 406(1)-406(N) in each of the RAUs 810(1), 810(2) based on an appropriate power allocation scheme, radiation footprint 812(1) of the RAU 810(1) and radiation footprint 812(2) of the RAU 810(2) can be better aligned with the length and the width of the rectangular-shaped coverage area 808. Accordingly, the RAUs 810(1), 810(2) can provide optimized RF coverage inside rectangular-shaped coverage area 808 while limiting power radiation outside the rectangular-shaped coverage area 808. Advantageously, the RAUs 810(1), 810(2) can also provide enhanced security in the rectangular-shaped coverage area 808 since RF coverage is contained inside the rectangular-shaped coverage area 808. Further, by employing the RAUs 810(1) and 810(2) each having the directional antennas 406(1)-406(N), it is possible to provide RF coverage in the rectangular-shaped coverage area 808 with a reduced number of RAUs, thus helping reduce DAS deployment costs.

Figure 9:
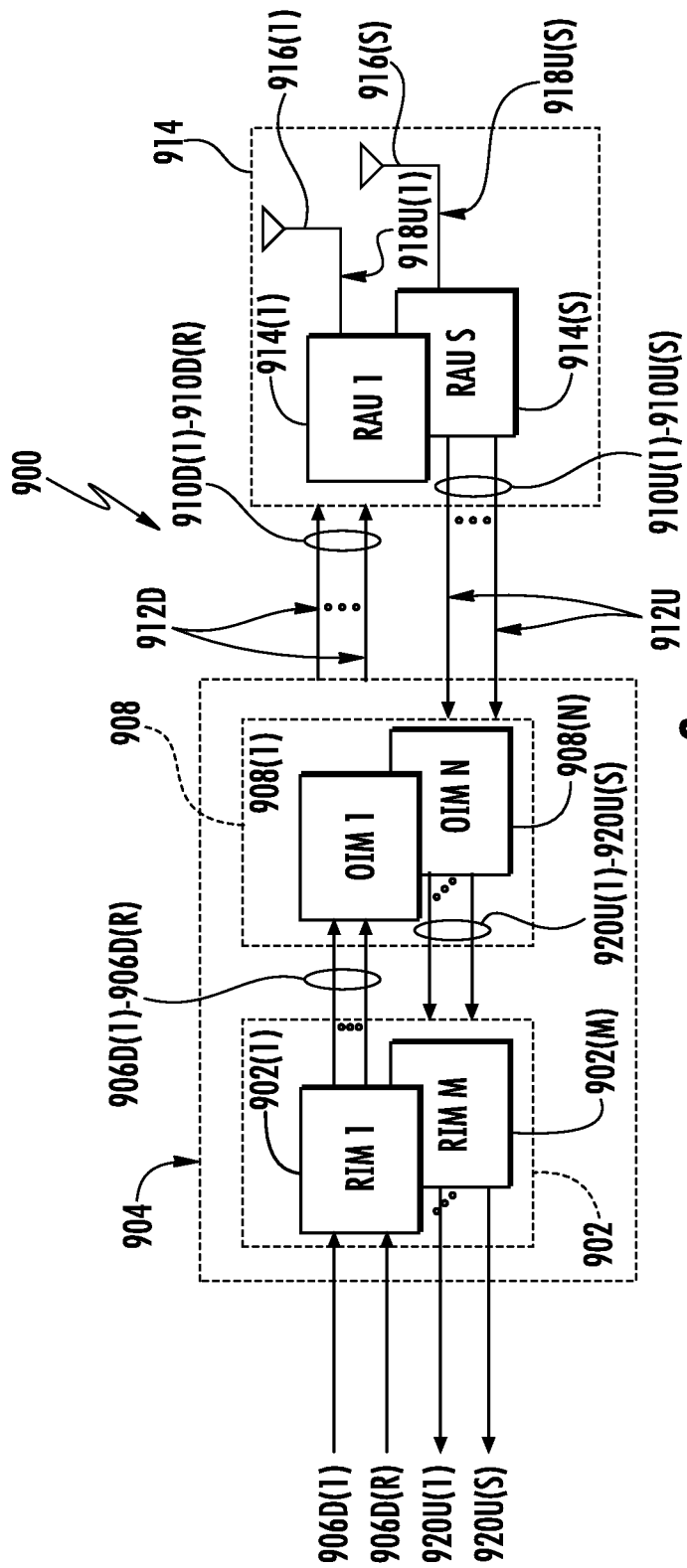
FIG. 9 is a schematic diagram of an exemplary optical fiber-based WDS provided in the form of an optical fiber-based DAS that includes the RAU of FIG. 4 in which the power generation circuit is configured to allocate power between the directional antennas based on the power allocation scheme.

FIG. 9 is a schematic diagram of an exemplary optical fiber-based WDS 900 provided in the form of an optical fiber-based DAS that includes the RAU 400 of FIG. 4, in which the power generation circuit 402 is configured to allocate power between the directional antennas 406(1)-406(N) based on the power allocation scheme. The WDS 900 includes an optical fiber for distributing communications services for multiple frequency bands. The WDS 900 in this example is comprised of three (3) main components. One or more radio interfaces provided in the form of radio interface modules (RIMs) 902(1)-902(M) are provided in a head-end unit (HEU) 904 to receive and process downlink electrical communications signals 906D(1)-906D(R) prior to optical conversion into downlink optical fiber-based communications signals. The downlink electrical communications signals 906D(1)-906D(R) may be received from a base station as an example. The RIMs 902(1)-902(M) provide both downlink and uplink interfaces for signal processing. The notations "1-R" and "1-M" indicate that any number of the referenced component, 1-R and 1-M, respectively, may be provided. The HEU 904 is configured to accept the RIMs 902(1)-902(M) as modular components that can easily be installed and removed or replaced in the HEU 904. In one example, the HEU 904 is configured to support up to twelve (12) RIMs 902(1)-902(12). Each RIM 902(1)-902(M) can be designed to support a particular type of radio source or range of radio sources (i.e., frequencies) to provide flexibility in configuring the HEU 904 and the WDS 900 to support the desired radio sources.

For example, one RIM 902 may be configured to support the Personalized Communications System (PCS) radio band. Another RIM 902 may be configured to support the 800 megahertz (MHz) radio band. In this example, by inclusion of the RIMs 902(1)-902(M), the HEU 904 could be configured to support and distribute communications signals on both PCS and Long-Term Evolution (LTE) 700 radio bands, as an example. The RIMs 902 may be provided in the HEU 904 that support any frequency bands desired, including but not limited to the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 902(1)-902(M) may also be provided in the HEU 904 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 902(1)-902(M) may be provided in the HEU 904 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 9, the downlink electrical communications signals 906D(1)-906D(R) are provided to a plurality of optical interfaces provided in the form of optical interface modules (OIMs) 908(1)-908(N) in this embodiment to convert the downlink electrical communications signals 906D(1)-906D(R) into downlink optical fiber-based communications signals 910D(1)-910D(R). The notation "1-N" indicates that any number of the referenced component 1-N may be provided. The OIMs 908(1)-908(N) may be configured to provide one or more optical interface components (OICs) that contain optical-to-electrical (O/E) and electrical-to-optical (E/O) converters, as will be described in more detail below. The OIMs 908(1)-908(N) support the radio bands that can be provided by the RIMs 902(1)-902(M), including the examples previously described above.

The OIMs 908(1)-908(N) each include E/O converters to convert the downlink electrical communications signals 906D(1)-906D(R) into the downlink optical fiber-based communications signals 910D(1)-910D(R). The downlink optical fiber-based communications signals 910D(1)-910D (R) are communicated over a downlink optical fiber-based communications medium 912D to a plurality of remote antenna units (RAUs) 914(1)-914(S). At least one RAU among the RAUs 914(1)-914(S) is provided as the RAU 400 of FIG. 4 in which the power generation circuit 402 is configured to allocate power between the directional antennas 406(1)-406(N) based on the power allocation scheme. The notation "1-S" indicates that any number of the referenced component 1-S may be provided. RAU O/E converters provided in the RAUs 914(1)-914(S) convert the downlink optical fiber-based communications signals 910D(1)-910D(R) back into the downlink electrical communications signals 906D(1)-906D(R), which are provided to antennas 916(1)-916(S) in the RAUs 914(1)-914(S) to client devices in the reception range of the antennas 916(1)-916(S).

RAU E/O converters are also provided in the RAUs 914(1)-914(S) to convert uplink electrical communications signals 918U(1)-918U(S) received from the client devices through the antennas 916(1)-916(S) into uplink optical fiber-based communications signals 910U(1)-910U(S). The RAUs 914(1)-914(S) communicate the uplink optical fiber-based communications signals 910U(1)-910U(S) over an uplink optical fiber-based communications medium 912U to the OIMs 908(1)-908(N) in the HEU 904. The OIMs 908 (1)-908(N) include O/E converters that convert the received uplink optical fiber-based communications signals 910U(1)-910U(S) into uplink electrical communications signals 920U(1)-920U(S), which are processed by the RIMs 902 (1)-902(M) and provided as the uplink electrical communications signals 920U(1)-920U(S). The HEU 904 may provide the uplink electrical communications signals 920U(1)-920U(S) to a base station or other communications system.

Note that the downlink optical fiber-based communications medium 912D and the uplink optical fiber-based communications medium 912U connected to each RAU 914(1)-914(S) may be a common optical fiber-based communications medium, wherein for example, wave division multiplexing (WDM) is employed to provide the downlink optical fiber-based communications signals 910D(1)-910D(R) and the uplink optical fiber-based communications signals 910U(1)-910U(S) on the same optical fiber-based communications medium.

Figure 10:
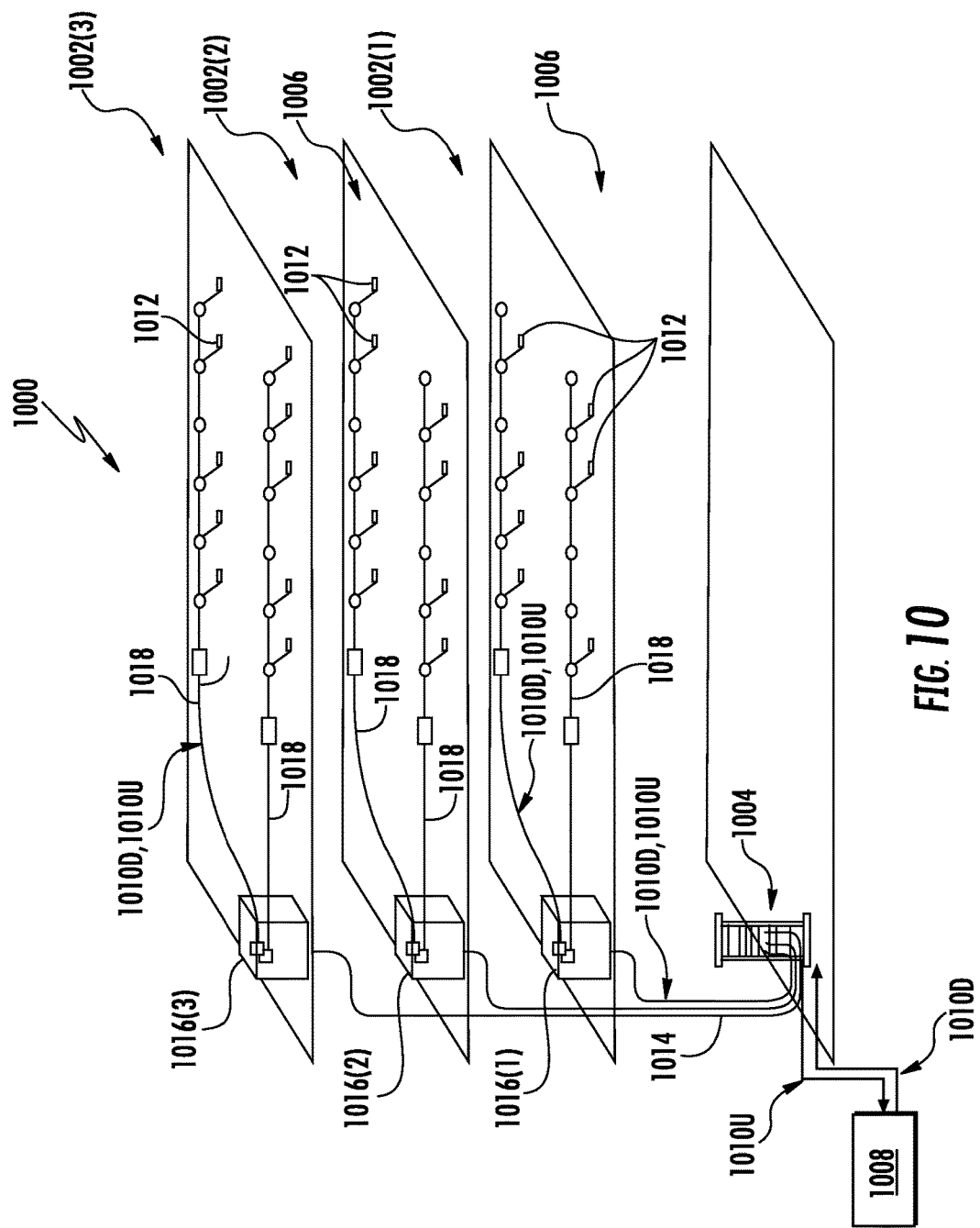
FIG. 10 is a partial schematic cut-away diagram of an exemplary building infrastructure in which the WDS of FIG. 9 can be provided.

The WDS 900 of FIG. 9 may be provided in an indoor environment, as illustrated in FIG. 10. FIG. 10 is a partial schematic cut-away diagram of an exemplary building infrastructure 1000 in which the WDS 900 of FIG. 9 can be employed. The building infrastructure 1000 in this embodiment includes a first (ground) floor 1002(1), a second floor 1002(2), and a third floor 1002(3). The floors 1002(1)-1002 (3) are serviced by an HEU 1004 to provide antenna coverage areas 1006 in the building infrastructure 1000. The HEU 1004 is communicatively coupled to a base station 1008 to receive downlink communications signals 1010D from the base station 1008. The HEU 1004 is communicatively coupled to a plurality of RAUs 1012 to distribute the downlink communications signals 1010D to the RAUs 1012 and to receive uplink communications signals 1010U from the RAUs 1012, as previously discussed above. The downlink communications signals 1010D and the uplink communications signals 1010U communicated between the HEU 1004 and the RAUs 1012 are carried over a riser cable 1014. The riser cable 1014 may be routed through interconnect units (ICUs) 1016(1)-1016(3) dedicated to each of the floors 1002(1)-1002(3) that route the downlink communications signals 1010D and the uplink communications signals 1010U to the RAUs 1012 and also provide power to the RAUs 1012 via array cables 1018.

Figure 11:
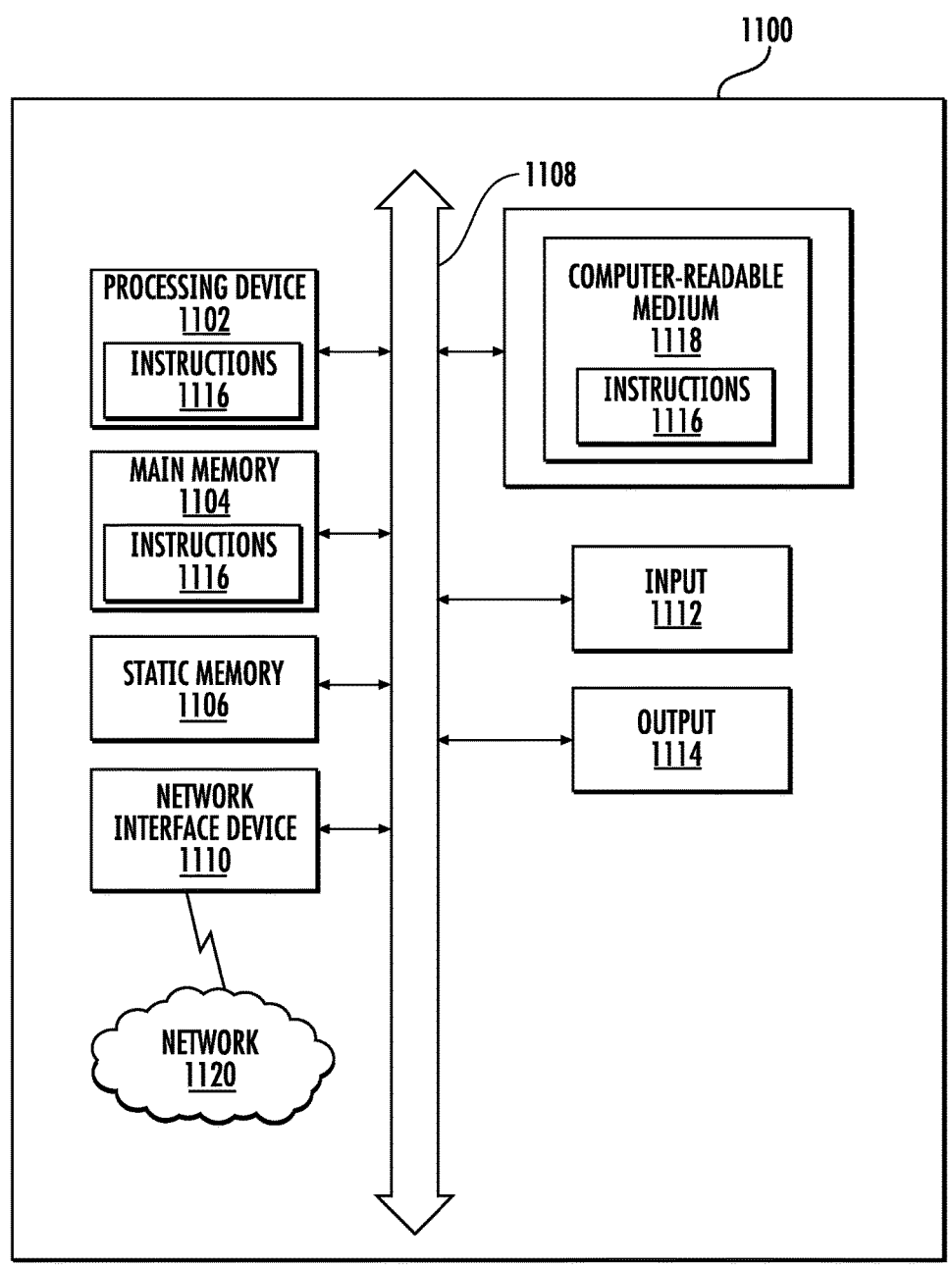
FIG. 11 is a schematic diagram representation of additional detail illustrating an exemplary computer system that could be employed in a control circuit, including a controller in the RAU of FIG. 4 for instructing the power generation circuit to allocate power between the directional antennas based on the power allocation scheme.

FIG. 11 is a schematic diagram representation of additional detail illustrating an exemplary computer system 1100 that could be employed in a control circuit, including the controller 438 of FIG. 4 for instructing the power generation circuit 402 in the RAU 400 to allocate power between the directional antennas 406(1)-406(N) based on the power allocation scheme. In this regard, the computer system 1100 is adapted to execute instructions from an exemplary computer-readable medium to perform these and/or any of the functions or processing described herein.

In this regard, the computer system 1100 in FIG. 11 may include a set of instructions that may be executed to predict frequency interference to avoid or reduce interference in a multi-frequency DAS. The computer system 1100 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 1100 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 1100 in this embodiment includes a processing device or processor 1102, a main memory 1104 (e.g., read-only memory (ROM), flash memory, dynamic random access memory (DRAM), such as synchronous DRAM (SDRAM), etc.), and a static memory 1106 (e.g., flash memory, static random access memory (SRAM), etc.), which may communicate with each other via a data bus 1108. Alternatively, the processor 1102 may be connected to the main memory 1104 and/or the static memory 1106 directly or via some other connectivity means. The processor 1102 may be a controller including the controller 438 of FIG. 4, as an example, and the main memory 1104 or the static memory 1106 may be any type of memory.

The processor 1102 represents one or more general-purpose processing devices, such as a microprocessor, central processing unit, or the like. More particularly, the processor 1102 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 1102 is configured to execute processing logic in instructions for performing the operations and steps discussed herein.

The computer system 1100 may further include a network interface device 1110. The computer system 1100 also may or may not include an input 1112, configured to receive input and selections to be communicated to the computer system 1100 when executing instructions. The computer system 1100 also may or may not include an output 1114, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1100 may or may not include a data storage device that includes instructions 1116 stored in a computer-readable medium 1118. The instructions 1116 may also reside, completely or at least partially, within the main memory 1104 and/or within the processor 1102 during execution thereof by the computer system 1100, the main memory 1104 and the processor 1102 also constituting computer-readable medium. The instructions 1116 may further be transmitted or received over a network 1120 via the network interface device 1110.

While the computer-readable medium 1118 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote antenna unit (RAU) in a distributed antenna system (DAS), comprising:
   a plurality of directional antennas;
   a power generation circuit configured to:
     generate a power output having an aggregated power;
     receive a downlink communications signal having a predetermined power; and
     amplify the predetermined power to generate the power output having the aggregated power; and
   a controller configured to:
     instruct the power generation circuit to allocate the aggregated power to the plurality of directional antennas based on a power allocation scheme;
   wherein the plurality of directional antennas is configured to radiate the downlink communications signal at a plurality of allocated powers in a plurality of radiation directions, respectively.

2. The RAU of claim 1, wherein
   the controller is further configured to instruct the power generation circuit to divide the aggregated power into the plurality of allocated powers for the plurality of directional antennas based on the power allocation scheme.

3. The RAU of claim 2, wherein:
   the power allocation scheme comprises a plurality of assigned, power ratios for the plurality of directional antennas, respectively; and
   the controller is configured to instruct the power generation circuit to divide the aggregated power into the plurality of allocated powers for the plurality of directional antennas based on the plurality of assigned power ratios.

4. The RAU of claim 2, wherein the power generation circuit comprises a plurality of power amplifiers configured to:
   receive the downlink communications signal having the predetermined power; and
   amplify the predetermined power to generate the power output having the aggregated power.

5. The RAU of claim 2, wherein the plurality of directional antennas is configured to transmit the downlink communications signal in the plurality of radiation directions, respectively.

6. The RAU of claim 5, wherein at least two radiation directions among the plurality of radiation directions are substantially opposing radiation directions.

7. The RAU of claim 5, wherein at least two radiation directions among the plurality of radiation directions are substantially orthogonal radiation directions.

8. The RAU of claim 2, wherein the plurality of directional antennas comprises:
   a first directional antenna configured to transmit the downlink communications signal at a first allocated power in a first radiation direction;
   a second directional antenna configured to transmit the downlink communications signal at a second allocated power in a second radiation direction;
   a third directional antenna configured to transmit the downlink communications signal at a third allocated power in a third radiation direction; and
   a fourth directional antenna configured to transmit the downlink communications signal at a fourth allocated power in a fourth radiation direction.

9. The RAU of claim 8, wherein each of the first directional antenna, the second directional antenna, the third directional antenna, and the fourth directional antenna is a ninety degree(90°) directional antenna.

10. The RAU of claim 8, wherein the first directional antenna, the second directional antenna, the third directional antenna, and the fourth directional antenna have different beamwidths.

11. The RAU of claim 8, wherein:
the first radiation direction of the first directional antenna substantially opposes the third radiation direction of the third directional antenna;
the second radiation direction of the second directional antenna substantially opposes the fourth radiation direction of the fourth directional antenna; and
the second radiation direction of the second directional antenna is substantially orthogonal to the first radiation direction of the first directional antenna.

12. The RAU of claim 8, wherein:
the first allocated power of the first directional antenna equals the third allocated power of the third directional antenna;
the second allocated power of the second directional antenna equals the fourth allocated power of the fourth directional antenna; and
the first allocated power is different from the second allocated power.

13. The RAU of claim 8, wherein the power generation circuit comprises:
a splitter combiner configured to:
receive the downlink communications signal having the predetermined power; and
split the downlink communications signal into a first downlink communications signal having approximately one-half of the predetermined power and a second downlink communications signal having approximately one-half of the predetermined power;
a first splitter combiner configured to receive and split the first downlink communications signal into an upper first downlink communications signal having approximately one-quarter of the predetermined power and a lower first downlink communications signal having approximately one-quarter of the predetermined power;
a second splitter combiner configured to receive and split the second downlink communications signal into an upper second downlink communications signal having approximately one-quarter of the predetermined power and a lower second downlink communications signal having approximately one-quarter of the predetermined power;
a first phase shifter configured to phase-shift the upper first downlink communications signal to a first phase;
a second phase shifter configured to phase-shift the lower first downlink communications signal to a second phase;
a third phase shifter configured to phase-shift the upper second downlink communications signal to a third phase;
a fourth phase shifter configured to phase-shift the lower second downlink communications signal to a fourth phase;
a first power amplifier configured to amplify the upper first downlink communications signal to a first output power;
a second power amplifier configured to amplify the lower first downlink communications signal to a second output power;
a third power amplifier configured to amplify the upper second downlink communications signal to a third output power; and
a fourth power amplifier configured to amplify the lower second downlink communications signal to a fourth output power.

14. The RAU of claim 13, wherein the power generation circuit further comprises:
an upper splitter combiner configured to allocate the first output power and the second output power between the third allocated power and the first allocated power; and
a lower splitter combiner configured to allocate the third output power and the fourth output power between the second allocated power and the fourth allocated power.

15. The RAU of claim 14, wherein the power generation circuit further comprises:
a first secondary phase shifter configured to phase-shift the upper first downlink communications signal from the first phase to an adjusted first phase;
a second secondary phase shifter configured to phase-shift the lower first downlink communications signal from the second phase to an adjusted second phase;
a third secondary phase shifter configured to phase-shift the upper second downlink communications signal from the third phase to an adjusted third phase;
a fourth secondary phase shifter configured to phase-shift the lower second downlink communications signal from the fourth phase to an adjusted fourth phase;
a first secondary splitter combiner configured to allocate the aggregated power to the first directional antenna and the second directional antenna; and
a second secondary splitter combiner configured to allocate the aggregated power to the third directional antenna and the fourth directional antenna.

16. A method for allocating power between a plurality of directional antennas in a remote antenna unit (RAU) in a distributed antenna system (DAS), comprising:
receiving a downlink communications signal having a predetermined power;
amplifying the predetermined power to generate a power output having an aggregated power;
allocating the aggregated power to the plurality of directional antennas based on a power allocation scheme; and
radiating the downlink communications signal at a plurality of allocated powers in a plurality of radiation directions, respectively.

17. The method of claim 16, further comprising
dividing the aggregated power into the plurality of allocated powers for the plurality of directional antennas based on the power allocation scheme.

18. The method of claim 17, further comprising dividing the aggregated power into the plurality of allocated powers for the plurality of directional antennas based on a plurality of assigned power ratios in the power allocation scheme.

19. The method of claim 18, further comprising transmitting the downlink communications signal in the plurality of radiation directions, respectively.

* * * * *

UNITED STATES PATENT AND TRADEMARK OFFICE
CERTIFICATE OF CORRECTION

PATENT NO. : 10,200,960 B2  
APPLICATION NO. : 15/920789  
DATED : February 5, 2019  
INVENTOR(S) : Dror Harel Page 1 of 1

It is certified that error appears in the above-identified patent and that said Letters Patent is hereby corrected as shown below:

In the Claims

In Column 26, Line 22, Claim 3, delete "assigned," and insert -- assigned --, therefor.

In Column 26, Line 63, Claim 9, delete "degree(90°)" and insert -- degree (90°) --, therefor.

Signed and Sealed this  
Fourteenth Day of January, 2020

Andrei Iancu  
*Director of the United States Patent and Trademark Office*